United States Patent
Chambers et al.

(10) Patent No.: US 10,616,272 B2
(45) Date of Patent: Apr. 7, 2020

(54) DYNAMICALLY DETECTING ABNORMALITIES IN OTHERWISE LEGITIMATE EMAILS CONTAINING UNIFORM RESOURCE LOCATORS (URLS)

(71) Applicant: Proofpoint, Inc., Sunnyvale, CA (US)

(72) Inventors: Charles Wade Chambers, Sunnyvale, CA (US); Martin Traverso, Menlo Park, CA (US); Dain Sidney Sundstrom, Palo Alto, CA (US); David Andrew Phillips, Sunnyvale, CA (US); David Eric Hagar, Mountain View, CA (US); Mark Erol Kent, Mountain View, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 83 days.

(21) Appl. No.: 15/920,110

(22) Filed: Mar. 13, 2018

(65) Prior Publication Data

US 2018/0227324 A1    Aug. 9, 2018

Related U.S. Application Data

(63) Continuation-in-part of application No. 15/878,611, filed on Jan. 24, 2018, now Pat. No. 10,243,991, which is a continuation of application No. 15/418,578, filed on Jan. 27, 2017, now Pat. No. 9,912,694, which is a continuation of application No. 13/913,231, filed on Jun. 7, 2013, now Pat. No. 9,602,523, (Continued)

(51) Int. Cl.
*H04L 29/06* (2006.01)
*G06F 16/901* (2019.01)
(Continued)

(52) U.S. Cl.
CPC ...... *H04L 63/1466* (2013.01); *G06F 16/9024* (2019.01); *G06F 21/85* (2013.01);
(Continued)

(58) Field of Classification Search
None
See application file for complete search history.

(56) References Cited

U.S. PATENT DOCUMENTS 7,516,488 B1 * 4/2009 Kienzle ................. H04L 51/12
                                                        726/22
7,548,956 B1    6/2009 Aoki et al.
(Continued)

OTHER PUBLICATIONS

Graham, Paul. "A Plan for Spam." Aug. 2002, <http://www.paulgraham.com/spam.html>, pp. 1-13.
(Continued)

*Primary Examiner* — Henry Tsang
(74) *Attorney, Agent, or Firm* — Carr & Ferrell LLP

(57) ABSTRACT

Dynamically detecting abnormalities in otherwise legitimate emails containing Uniform Resource Locators (URLs) is provided. An example method includes determining one or more rules defining normal patterns in a number of sending Top-Level Domains of previously received emails received via a computer network to a user or group of users; generating a trusted trends criteria for a received email, associated with the user or the group of users, by evaluating the received email against the one or more rules; determining whether the trusted trends criteria exceeds a predetermined threshold; in response to exceeding the predetermined threshold, generating a second URL and applying it to the received email by replacing a first URL of the received email with the second URL; and redetermining the one or more rules defining normal patterns in the number of sending Top-Level Domains based on the previously received emails and the received email.

17 Claims, 23 Drawing Sheets

Related U.S. Application Data application No. 15/920,110, which is a continuation-in-part of application No. 13/673,286, filed on Nov. 9, 2012, now Pat. No. 10,104,029.

(60) Provisional application No. 61/656,920, filed on Jun. 7, 2012, provisional application No. 61/557,728, filed on Nov. 9, 2011.

(51) Int. Cl.
*G06F 21/85* (2013.01)
*G06Q 10/10* (2012.01)
*H04L 12/58* (2006.01)
*H04W 12/12* (2009.01)

(52) U.S. Cl.
CPC ........... *G06Q 10/107* (2013.01); *H04L 51/12* (2013.01); *H04L 51/18* (2013.01); *H04L 63/1416* (2013.01); *H04L 63/1441* (2013.01); *H04W 12/1208* (2019.01)

(56) References Cited

U.S. PATENT DOCUMENTS

| | | | |
|---|---|---|---|
| 7,716,297 B1 | 5/2010 | Wittel et al. | |
| 8,392,357 B1 | 3/2013 | Zou et al. | |
| 10,104,029 B1 | 10/2018 | Chambers et al. | |
| 2002/0199095 A1 | 12/2002 | Bandini et al. | |
| 2006/0026242 A1 | 2/2006 | Kuhlmann et al. | |
| 2006/0059238 A1* | 3/2006 | Slater | G06Q 10/107 709/206 |
| 2006/0168041 A1* | 7/2006 | Mishra | H04L 29/1215 709/206 |
| 2007/0097976 A1* | 5/2007 | Wood | H04L 63/1416 370/392 |
| 2007/0107059 A1 | 5/2007 | Chasin et al. | |
| 2008/0140781 A1* | 6/2008 | Bocharov | G06Q 10/107 709/206 |
| 2008/0256187 A1* | 10/2008 | Kay | H04L 51/12 709/206 |
| 2010/0185739 A1 | 7/2010 | Shuster | |
| 2013/0325991 A1 | 12/2013 | Chambers et al. | |

OTHER PUBLICATIONS

Kalafut et al. "Malicious Hubs: Detecting Abnormally Malicious Autonomous Systems." IEEE International Conference on Computer Communications (INFOCOM) Mini-Conference, Mar. 2010, pp. 1-5.

\* cited by examiner

Spam Rules

| Enabled | Classification | Description | Condition | Action | Order | | |
|---|---|---|---|---|---|---|---|
| ☐ | spam_definite | Definite Spam | Spam score greater than or equal to 100 | • Add header X-Proofpoint-Spam-Details=$SpamDetails.<br>• Discard the message. | ▶ | Edit | Delete |
| ☒ | phish | Phish Spam | Phish spam score greater than or equal to 80 AND Spam score greater than or equal to 50 | • Add header X-Proofpoint-Spam-Details=$SpamDetails.<br>• Send to quarantine folder [Phish].<br>• Discard the message. | ◀ ▶ | Edit | Delete |
| ☒ | adult | Adult Spam | Adult spam score greater than or equal to 80 AND Spam score greater than or equal to 50 | • Add header X-Proofpoint-Spam-Details=$SpamDetails.<br>• Send to quarantine folder [Adult].<br>• Discard the message. | ◀ ▶ | Edit | Delete |
| ☒ | spam | Spam | Spam score greater than or equal to 50 | • Add header X-Proofpoint-Spam-Details=$SpamDetails.<br>• Send to quarantine.<br>• Discard the message. | ◀ ▶ | Edit | Delete |
| ☐ | bulk | Bulk Email | Bulk email score greater than or equal to 80 | • Add header X-Proofpoint-Spam-Details=$SpamDetails.<br>• Send to quarantine folder [Bulk].<br>• Discard the message. | ◀ ▶ | Edit | Delete |
| ☐ | suspect | Delay Suspected Messages | Suspected spam score greater than or equal to 80 | • Add header X-Proofpoint-Spam-Details=$SpamDetails.<br>• Send to quarantine folder [Suspected Spam].<br>• Discard the message. | ◀ | Edit | Delete |
| ☐ | notspam | Not Spam | Spam score greater than or equal to 0 | • Add header X-Proofpoint-Spam-Details=$SpamDetails. | | Edit | |

DYNAMICALLY DETECTING ABNORMALITIES IN OTHERWISE LEGITIMATE EMAILS CONTAINING UNIFORM RESOURCE LOCATORS (URLS)

CROSS REFERENCE TO RELATED APPLICATIONS

This application is a continuation-in part of U.S. application Ser. No. 15/878,611, filed on Jan. 24, 2018, which is a continuation of U.S. application Ser. No. 15/418,578, filed on Jan. 27, 2017 (issued as U.S. Pat. No. 9,912,694, on Mar. 6, 2018) which is a continuation of U.S. application Ser. No. 13/913,231, filed on Jun. 7, 2013 (issued as U.S. Pat. No. 9,602,523 on Mar. 21, 2017) which claims the benefit of U.S. Provisional Application No. 61/656,920, filed on Jun. 7, 2012; and this application is also a continuation-in-part of U.S. application Ser. No. 13/673,286, filed on Nov. 9, 2012 (issued as U.S. Pat. No. 10,104,029 on Oct. 16, 2018) which claims the benefit of U.S. Provisional Application No. 61/557,728, filed on Nov. 9, 2011), all of which are hereby incorporated by reference herein in their entirety.

FIELD OF THE PRESENT TECHNOLOGY

The present invention relates to the field of graphical user interfaces for computer systems and, and more specifically, but not by way of limitation, to cloud-based threat detection systems that generate threat insight dashboards for providing visibility into persistent threats.

BACKGROUND

Malicious electronic messages may include, for example, spam, phishing, bulk, adult, and other similar content, which are designed to generate revenue. The messages may be in the form of email, instant messages, and the like. Although the description herein includes examples and other description of messages in the email context, the present invention is not limited to email messages. In addition, some types of malicious emails are designed to steal sensitive information such as bank account information, credit card account information, usernames and passwords, and social security numbers—just to name a few. Some malicious emails such as phishing emails will appear to be generated by a legitimate source, such as a merchant with which the end user conducts business. These emails may include logos, trademarks, and/or other source indicators used to make the email appear to be legitimate. These types of emails are often referred to as spoofed email or cloned emails. Some types of spoofed/cloned emails may be specifically targeted to certain individuals and are often referred to as spear phishing attacks.

With regard to spoofed emails, these malicious emails will also include a hyperlink appearing to be associated with a legitimate website operated by the merchant. Unfortunately, these hyperlinks are linked to malicious resources designed to steal sensitive information from end users. For example, the malicious resource may include a fake login page spoofing the login page of an online banking interface. When the end user enters their logon information, the logon information is exposed and captured.

SUMMARY

According to some embodiments, the present technology may be directed to methods providing a threat dashboard via a cloud-based threat detection system, where the cloud-based threat detection system comprising a CPU and a memory. The methods comprise: (a) locating metrics regarding a malicious attack against a targeted resource, the metrics indicating instances where users were exposed to the malicious attack or instances where the cloud-based threat detection system prevented the user from being exposed to the malicious attack; and (b) rendering a threat dashboard for a web browser application of a client device, the threat dashboard comprising the located metrics.

According to other embodiments, the present technology may be directed to a cloud-based threat detection system for providing a threat insight dashboard. The system comprises: (a) a processor; and (b) a memory for storing logic, the logic being executed by the processor to execute operations comprising: (i) providing a threat insight dashboard comprising metrics regarding a malicious attack against a targeted resource, the metrics indicating instances where users were exposed to the malicious attack or instances where the cloud-based threat detection system prevented the user from being exposed to the malicious attack; and (ii) rendering the threat dashboard for a web browser application of a client device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 5 is a table of exemplary spam rules that are utilized to categorize emails.

DETAILED DESCRIPTION OF EXEMPLARY EMBODIMENTS

Figure 1:
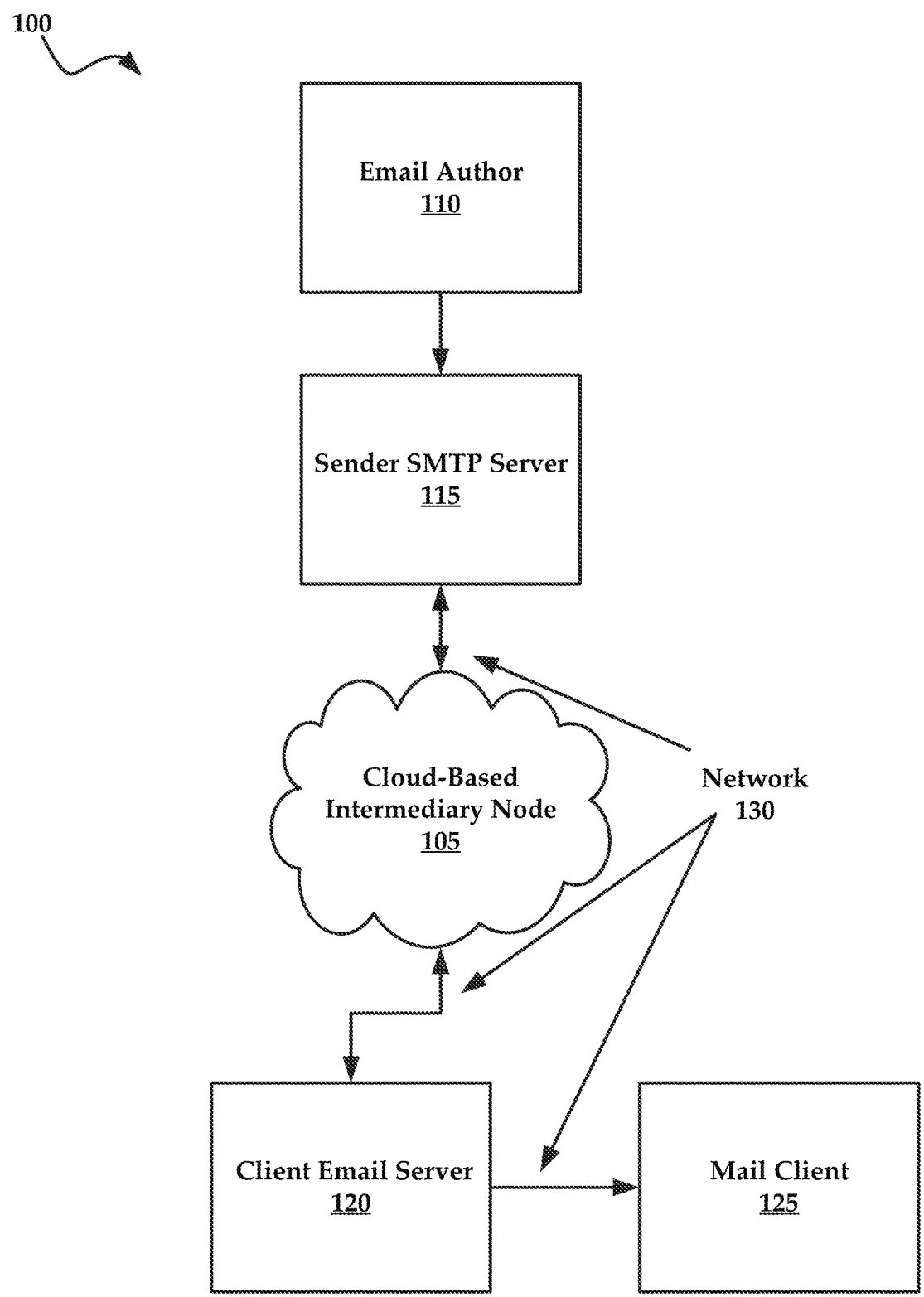
FIG. 1 illustrates an exemplary architecture for practicing aspects of the present technology.

While this technology is susceptible of embodiment in many different forms, there is shown in the drawings and will herein be described in detail several specific embodiments with the understanding the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology is directed to systems and methods for generating threat insight dashboards that provide users with visual metrics regarding malicious attacks against targeted resources such as computing systems, email messages, server, or other resources.

Dashboards generated by the present technology may provide unprecedented visibility into persistent threats, for example, through a unique threat insight dashboard, which will be described in greater detail with reference to FIGS. 12 and 13. The threat insight dashboard may include a web-based threat dashboard and/or configurable alerts that may allow administrators and security professionals the ability to identify one or more of malicious attacks, the scope of these attacks (e.g., just their organization or wider industry), which individuals are being targeted by the attacks, the nature of the attacks (i.e., malware, credential phishing etc.), and what remediation actions (if any) are necessary.

Exemplary processes for detecting malicious messages will be described herein as well to provide sufficient context for populating the various dashboards with metrics regarding malicious threats which were detected and neutralized by the cloud-based threat detection system.

In some instances, the present technology may provide location metrics for a particular threat, referred to as a "malicious attack." Fraudsters will often direct these malicious attacks against a particular entity or object, such as a web-page, a web-form within a web page, an email message, media content, a document, a server, a computing system, and so forth. The entity or object subject to the malicious attack will be referred to as a "targeted resource."

Malicious messages may be in the form of email, instant messages, and the like. Although the description herein includes examples and other description of messages in the email context, the present invention is not limited to email messages. More specifically, but not by way of limitation, the present technology may employ a cloud-based intermediary node (e.g., cloud-based threat detection system) that is configured to detect potentially malicious emails and confirm whether the email comprises malicious content. As background, a malicious email may include spam, adult, phishing, bulk, and/or other similar types of content. These emails serve to generate revenue for their respective authors, but are often an annoyance to the recipient, and may often be sent with nefarious intent. As mentioned above, some malicious emails may include links designed to deceive the recipient into disclosing sensitive information such as social security numbers, credit card numbers, and so forth.

If the email is likely to be malicious, the present technology may parse the email to determine if there are links included in the email that are associated with malicious resources. A malicious resource may include a spoofed website that is designed to induce the recipient into exposing their sensitive information, although other common malicious resources that would be known to one of ordinary skill in the art may likewise be detected by the present technology.

Once the present technology has determined an email includes a link to a potentially malicious resource, the present technology may exchange the link with an alternate link to a safe resource, such as a block webpage. The present technology may also modify the email to include a visual representation of the actual domain name of the potentially malicious resource so the recipient may see the true identity of the link. This feature may be advantageous in instances where the viewable text of the hyperlink is ambiguous and/or misleading. In some instances, access to the potentially malicious resource may be prohibited by deactivating or breaking the hyperlink such that the recipient cannot request or receive the resource by clicking on the hyperlink text. Hyperlinks embedded within images or other resources may also be processed in a similar manner. The present technology may also determine the link in an email is safe, i.e., certainly not malicious. For example, a link may be known to be safe since it is on a safelist or otherwise known to be safe.

The cloud-based threat detection system may also score email messages to determine a likelihood the email is malicious, as well as quarantining malicious emails, and generating blocklists of malicious resources, and safelists.

FIG. 1 illustrates an exemplary architecture 100 for practicing aspects of the present technology. According to some embodiments, the exemplary architecture 100, hereinafter "architecture 100," may generally include a cloud-based intermediary node, or cloud-based threat detection system hereinafter "intermediary node 105." Generally speaking, the intermediary node 105 may be configured to process emails by analyzing a link included in an email to determine if the link is associated with a potentially malicious resource and replacing the link with an alternate link to a trusted resource if the link is associated with a potentially malicious resource. In various embodiments, if the link is identified as being certainly malicious, the email is filtered and not delivered to the email server.

Provided below are various descriptions of scenarios where the intermediary node 105 detects and neutralizes malicious attacks, such as a phishing attack, against a targeted resource, such as an email message, or other similar targeted resource. It is noteworthy that many users may encounter or be exposed to such malicious attacks. Thus, the intermediary node 105 is capable of tracking the exposure of users to the malicious attack by analyzing information about the targeted resource. For example, the intermediary node 105 may track each instance of a user being exposed to the malicious attack, such as each email address to which the malicious attack was addressed.

The intermediary node 105 may also track other metrics such as (a) instances where users were exposed to the malicious attack; (b) instances where the intermediary node 105 prevented the user from being exposed to the malicious attack; (c) instances where users actuated the malicious attack; and (d) instances where the intermediary node 105 prevented the malicious attack from being actuated.

These metrics may be gathered for various users and tracked over a period of time. That is, the intermediary node 105 may track malicious attacks with reference to time. The intermediary node 105 may then use these time-referenced metrics to generate graphical or visual displays that may inform administrators about the threat profile of a malicious attack. Additional details regarding the tracking and display of metrics for malicious attacks will be provided with regard to FIGS. 12 and 13, which are described in greater detail infra.

In various embodiments, the intermediary node 105 may be configured to locate at least one uniform resource locator included in an email, analyzing the at least one uniform resource locator to determine if the at least one uniform resource locator is associated with a potentially malicious resource, and replace the at least one uniform resource locator with an alternate link to a trusted resource if the at least one uniform resource locator is associated with a potentially malicious resource.

According to some embodiments, the intermediary node 105 may be implemented within a cloud-based computing environment, i.e., cloud-based intermediary node 105. In general, a cloud-based computing environment is a resource typically combining the computational power of a large grouping of processors and/or combining the storage capacity of a large grouping of computer memories or storage devices. For example, systems providing a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Email authors 110 may compose emails delivered to a recipient by a sender server 115, which may include a server implementing simple mail transfer protocol ("SMTP"). Email authors 110 may compose both legitimate and/or malicious emails using an email program, which may include, for example, Outlook™, Entourage™, and so forth. The email author 110 may also compose and send emails using a web-based email interface. In a traditional configuration, the sender SMTP server 115 may deliver email messages directly to a client email server 120, which would deliver the email to a mail client 125, such as an email program or web-based email interface. The client email server 120 may comprise, for example, an enterprise email server such as Exchange™, Domino™, and so forth.

In accordance with the present technology, the intermediary node 105 may be positioned between the sender SMTP server 115 and the client email server 120. Thus, the intermediary node 105 may filter and/or process potentially/actually malicious emails before the emails are delivered to the client email server 120.

The components included in the architecture 100 may be communicatively coupled via a network 130. It is noteworthy to mention that the network 130 may include any one (or combination) of private or public communications networks such as the Internet.

Figure 2:
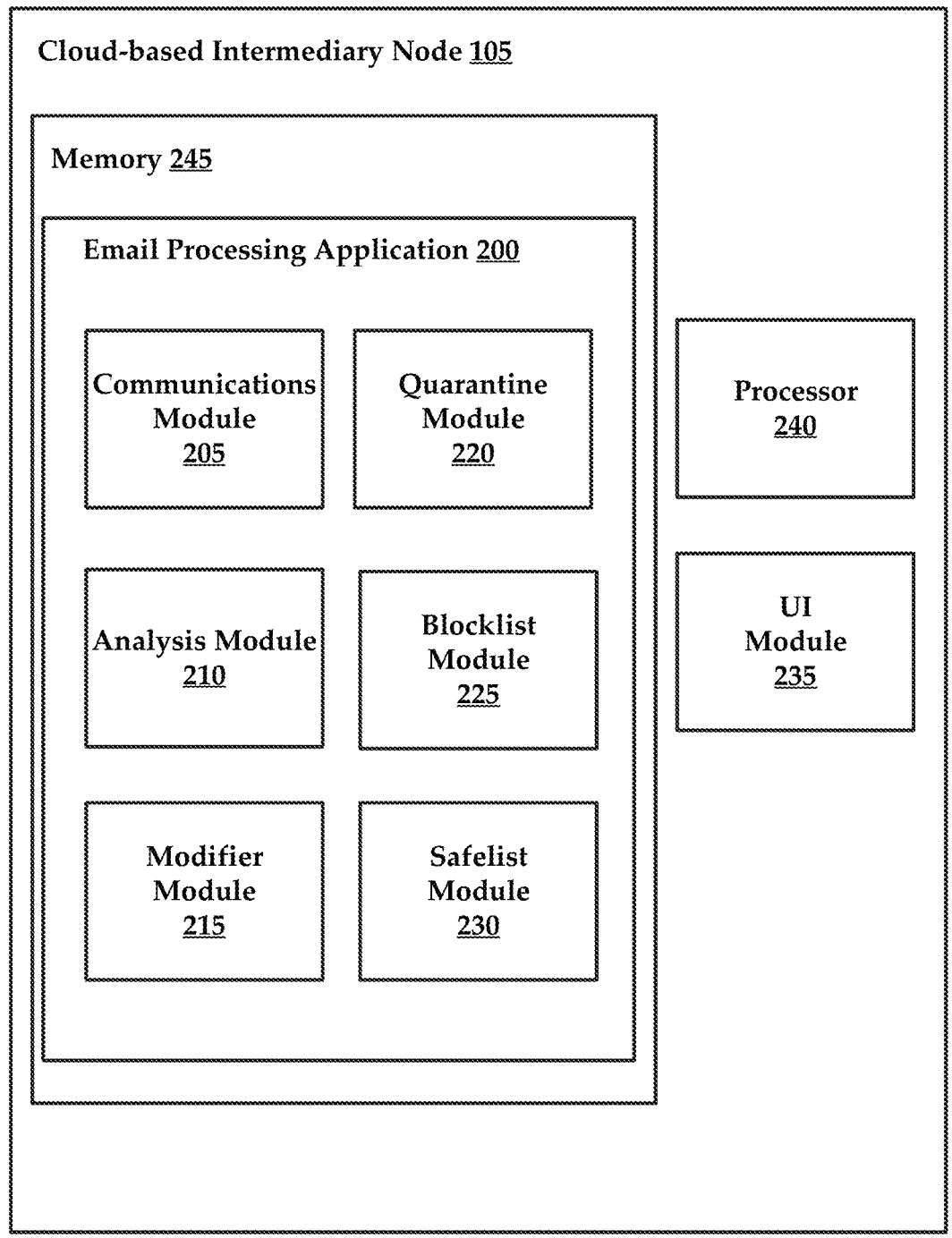
FIG. 2 is a block diagram of an exemplary email processing application for use in accordance with the present technology.

Referring now to FIG. 2, the cloud-based intermediary node 105 may include executable instructions that are stored in memory. These instructions may be executed by a processor of the intermediary node 105. An exemplary computing system including memory and a processor is described in greater detail with reference to FIG. 12. FIG. 2 includes a block diagram of an email processing application 200. According to some embodiments, when executed, the email processing application 200 may cause the intermediary node 105 to perform various methods for processing emails, which will be described in greater detail below.

According to some embodiments, the email processing application 200 may comprise a communications module 205, an analysis module 210, a modifier module 215, a quarantine module 220, and a blocklist module 225, and a safelist module 230. It is noteworthy that the email processing application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components providing the described functionality. In other embodiments, individual modules of the email processing application 200 may include separately configured web servers.

The email processing application 200 may reside within memory 245 of the intermediary node 105. The email processing application 200 may be stored as executable instructions executed by a processor 240. The processor 240 may be configured to control the functionalities of the intermediary node 105 described herein. That is, to provide the operations described in this disclosure, the processor 240 executes various instructions stored in memory 245. In some instances, the intermediary node 105 comprises a UI (User Interface) module 235 that generates threat insight dashboards. In some instances, the UI module 235 renders threat insight dashboards as web-based interfaces accessible by client devices, such as end user computing systems. Again, exemplary UIs (threat insight dashboards) are illustrated in FIGS. 12 and 13 and will be discussed in greater detail infra.

Figure 3:
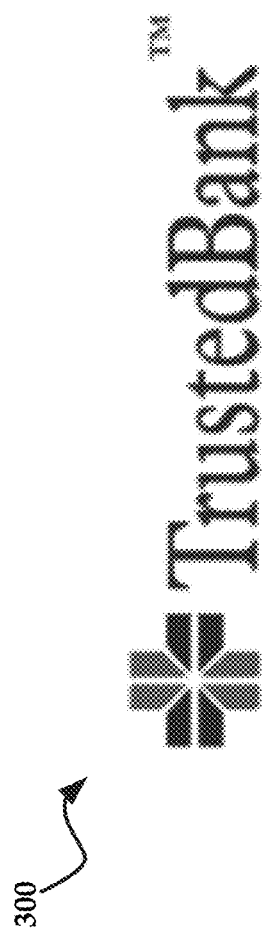
FIG. 3 is an exemplary malicious email in the form of a spoofed email.

Generally speaking, the communications module 205 may receive email messages, both malicious and non-malicious, from various sender SMTP server systems, as shown in FIG. 1. FIG. 3 illustrates an exemplary malicious email 300 that spoofs the layout and content of an exemplary email sent by a trusted organization, such as a bank. This email 300 includes an exemplary link 305, such as a hyperlink. While the link appears to be associated with the domain name of the trusted organization, an examination of the source code of the email reveals the link 305 is actually associated with a potentially malicious resource. For example, the source code for the link 305 may specify "<A HREF="http://www.spammer.domain">http://www.yourtrustedbank.com/general/cust verifyinfo.asp</A>," where http://www.spammer.domain includes a potentially malicious resource.

Once an email is received, the analysis module 210 may be executed to evaluate the email and determine if a link included in the email is associated with a potentially malicious resource. It will be understood that the emails may be pre-processed by a general purpose spam filter to remove emails that are easily identifiable as being certainly, not just potentially, malicious, just by a review of content included in the email. For example, an email including textual content referencing adult material may be automatically classified as spam and deleted or quarantined.

In addition, the pre-processing of emails may include the generation of a trust/reputation/spam score for the email.

Figure 4:
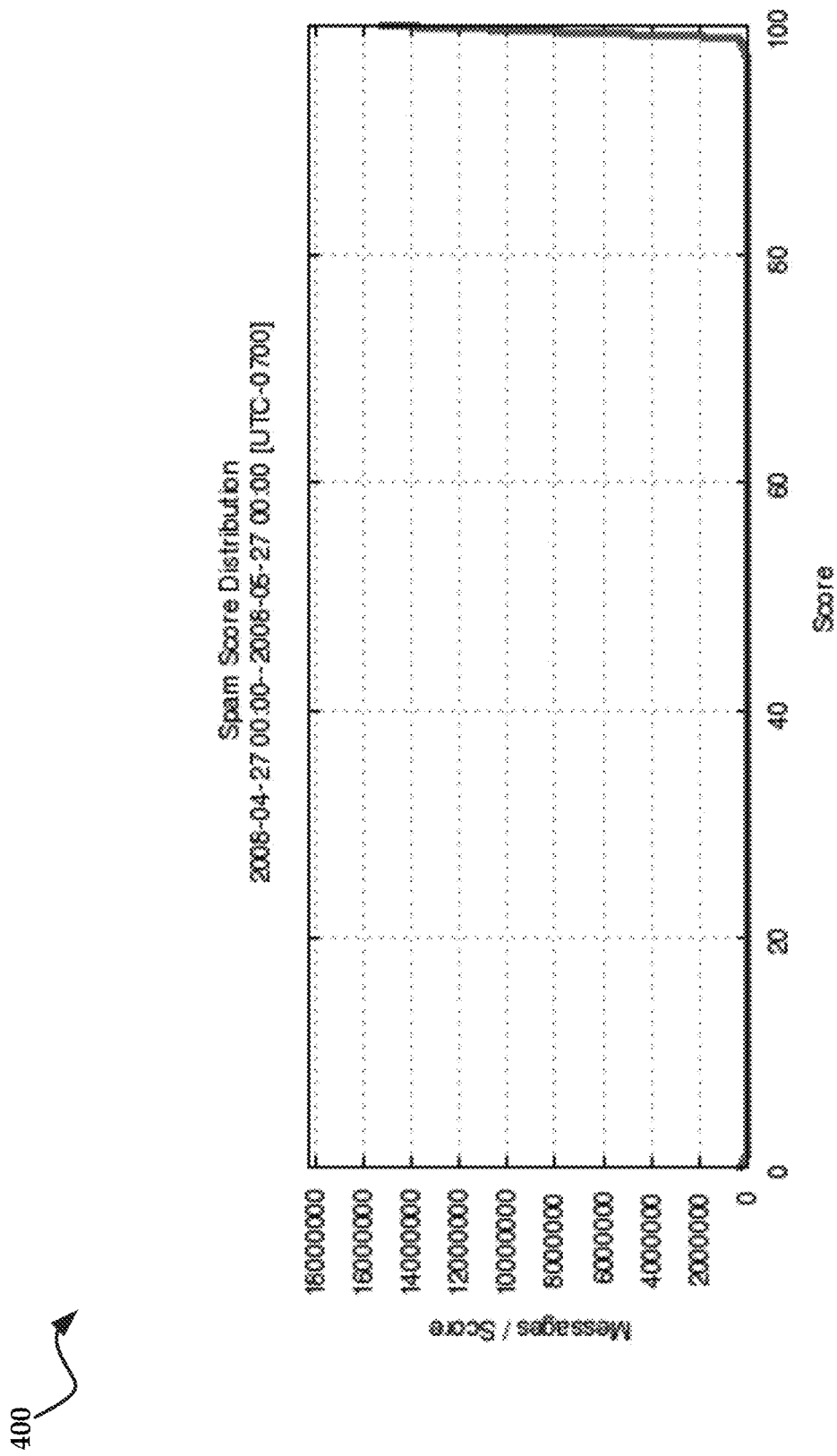
FIG. 4 is a graph of an exemplary distribution of spam scores generated for a plurality of email messages.

FIG. 4 illustrates a chart 400 which comprises an exemplary distribution of spam scores for a plurality of emails. As is shown, the vast majority of emails are, in fact, malicious. What is also apparent is that not all emails receive a score of zero (which indicates the email is definitely not malicious), or one hundred (which indicates the email is almost certain to be malicious). The present technology may aid in the processing of emails that receive a score somewhere between zero and one hundred (i.e., potentially malicious emails), although in some instances it may be advantageous to process all emails using the present technology. For example, email administrator may desire to identify and categorize as many malicious resources as possible to create a robust blocklist and a safelist, as will be described in greater detail below. In some embodiments, delivery of an email is temporarily delayed by the intermediate node 105, e.g., thirty minutes, in order to determine the disposition of an email message based on new information which might have been received during the delay period. After the delay period, the score of the message might be different and therefore, the associated action taken for the email may also be different.

FIG. 5 illustrates an exemplary table 500 comprising various attributes of spam rules applied to emails by the pre-processing system mentioned above. As is shown, emails may be classified as definite spam (emails with a spam score of 100), phishing, adult, spam, bulk, suspect, and notspam. Again, the present technology may assist in further processing emails categorized as "suspect", i.e., potentially malicious.

Once emails have been received by the communications module 205, the analysis module 210 may be executed to evaluate links associated with the emails. Again, a link may comprise any of a uniform resource locator ("URL"), a uniform resource indicator ("URI"), an Internet protocol address ("IP"), a domain name, or combinations thereof. The link may comprise any hyperlink associated with online resource. These resources may be linked to any of text, an image, a video, an icon, or any other object that can be included in an email message that would be known to one of ordinary skill in the art with the present disclosure before them. For example, a hyperlink often includes a text string (e.g., "Click Here") that instructs or entices the recipient into clicking on the hyperlink.

The analysis module 210 may conduct an initial evaluation of any of the links associated with an email. The analysis module 210 may employ any one (or combination) of a number of techniques for preliminarily evaluating a link. For example, the analysis module 210 may evaluate an age of a domain name associated with an online resource. The analysis module 210 may automatically classify links associated with domains that were registered within a specific time period as potentially malicious. By way of non-limiting example, links to domains registered within the last three days may be classified as potentially malicious.

Once a link has been found to be associated with a potentially malicious resource, the modifier module 215 may be executed to replace the link associated with potentially malicious resource with an alternate link. In some instances, the link may be replaced with an alternate link associated with a trusted resource such as a landing page. In some instances, the landing page may comprise a block webpage (see FIG. 7). In various embodiments, the alternate link may include a redirection script that directs the recipient to a well known search page or other resource.

For example, the modifier module 215 may modify the source code of the email to replace the link associated with the potentially malicious resource. In some instances, the modifier module 215 may display an indicator associated with the potentially malicious resource proximate the link. Thus, the domain name associated with the potentially malicious resource may be exposed to the email recipient. In some instances, the modifier module 215 may deactivate the link. That is, the modifier module 215 may modify the link in the email to prevent the email recipient from opening the potentially malicious resource. Thus, if the email recipient clicks on the link, no action is performed (i.e., the potentially malicious resource is not returned).

In some embodiments, emails may be quarantined by the quarantine module 220 when the email has been categorized as potentially malicious or alternatively after the link associated with email has been verified as malicious.

According to some embodiments, emails that have been categorized as potentially malicious and quarantined may be re-evaluated by the analysis module 210 while quarantined. For example, if an email includes a link associated with a domain that has only recently been registered, subsequent evaluation of the link after a given period of time may reveal the domain name is associated with a legitimate resource. Thus, while the link was initially categorized as potentially malicious, the link was actually non-malicious. The email may be redelivered to the client email server 120 and finally to the mail client 125.

In other embodiments, the email may not be quarantined, but the link may be provisionally deactivated. When subsequent analysis reveals the link is associated with a legitimate resource, the link in the email may be reactivated and the email pushed/delivered to the mail client 125. The analysis module 210 may include comparing information regarding the potentially malicious resource to safelists, which may be private or publically available safelists. These safelists may comprise IP addresses, domain names, MAC addresses, or other computing system indicators that may be used to identify an online resource.

The analysis module 210 may also verify a potentially malicious resource is, in fact, malicious. The analysis module 210 may include comparing information regarding the malicious resource to blocklists, which may be private or publically available blocklists. These blocklists may comprise IP addresses, domain names, MAC addresses, or other computing system indicators that may be used to identify an online resource. In various embodiments, the analysis module 210 may also conduct a deep-content inspection of the potentially malicious resource by loading the potentially malicious resource in a sandbox (e.g., testing) environment on the intermediary node 105.

Other methods for verifying the malicious nature of an online resource that would be known to one of ordinary skill in the art are also likewise contemplated for use in accordance with the present technology.

According to some embodiments, once a link has been confirmed to be associated with a malicious resource, the blocklist module 225 may be executed to store identifying information for that resource in a blacklist for future reference. Conversely, according to some embodiments, once a link has been confirmed to be associated with a safe resource that is certainly not malicious, the safelist module 230 may be executed to store identifying information for that resource in a safelist for future reference.

Figure 6:
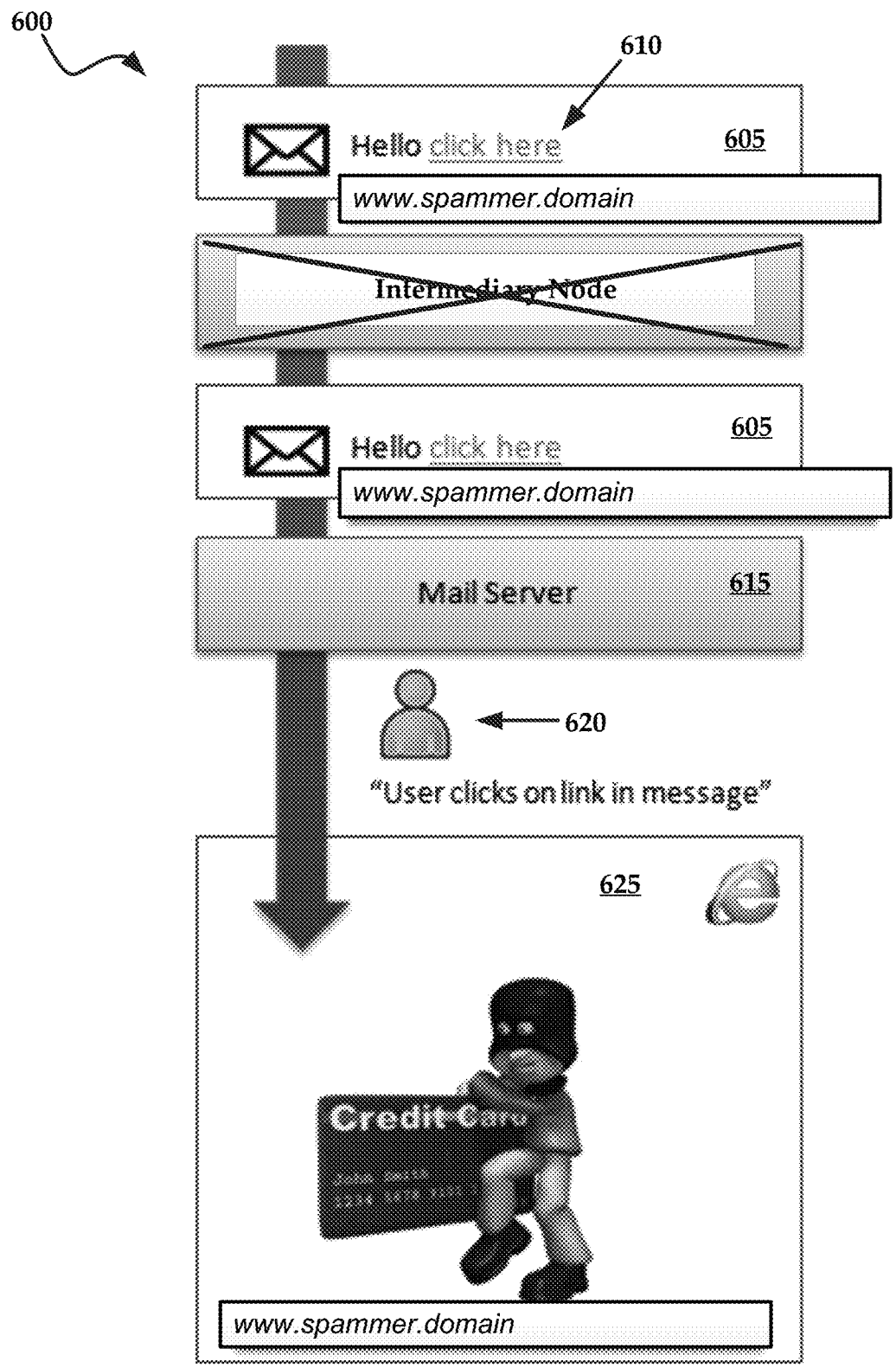
FIG. 6 is an exemplary flow diagram of a typical phishing attack.

FIG. 6 is a diagrammatical representation of a phishing attack 600 where a potentially malicious email is not intercepted or quarantined. Generally, a potentially malicious email 605 is received. The potentially malicious email 605 may comprise a link 610 to a potentially malicious resource. Because the potentially malicious email 605 is not processed by an intermediary node of the present technology, the email is received by the mail server 615 and passed through to a mail client 620. When the email recipient clicks on the link 610, a potentially malicious resource 625 is returned to the recipient. In this instance, the potentially malicious resource 625 may include a webpage designed to steal sensitive information from the recipient.

Figure 7:
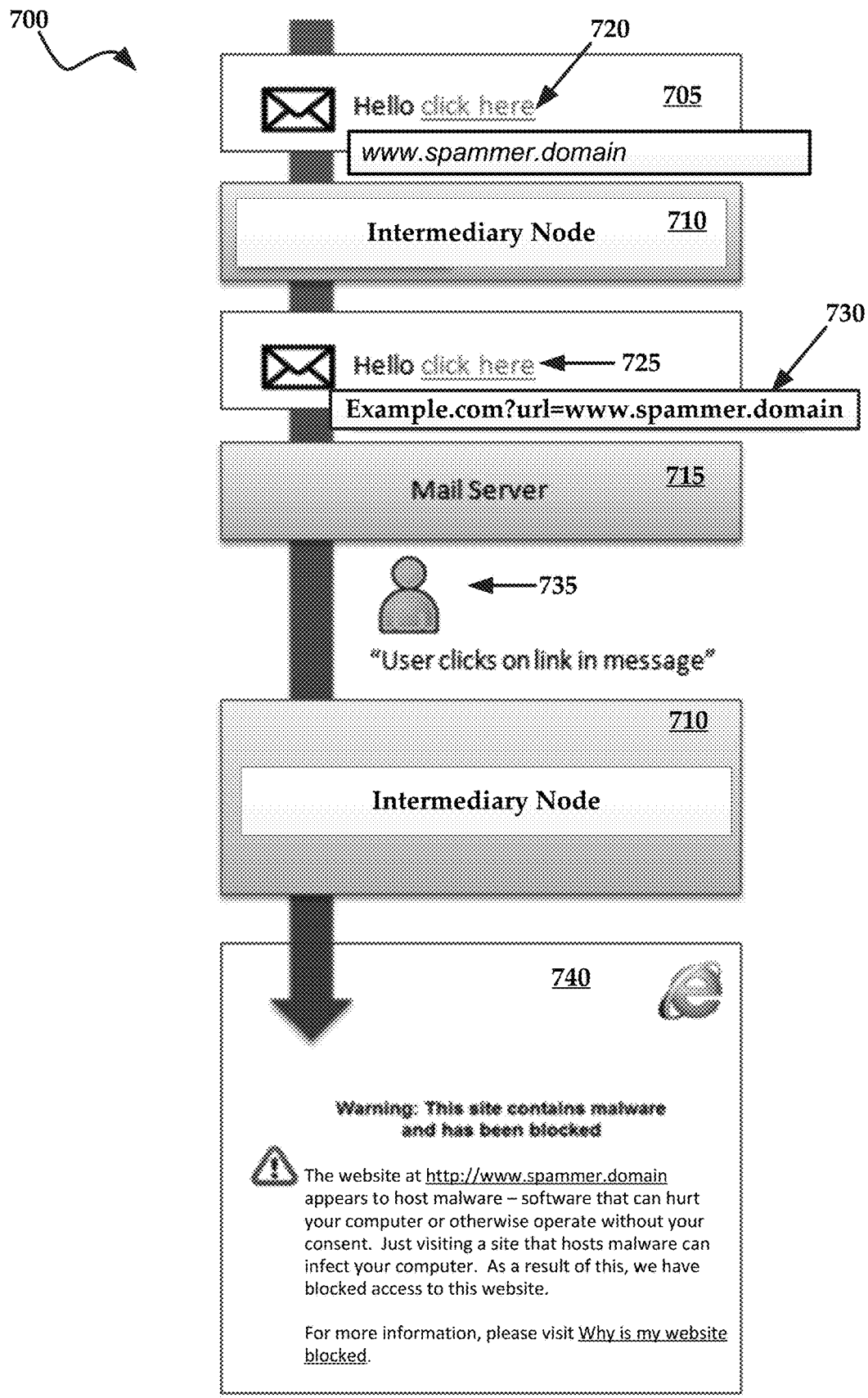
FIG. 7 is a diagrammatical representation of a phishing attack where a malicious email is detected and processed by the present technology.

FIG. 7 is a diagrammatical representation of a phishing attack 700 where a potentially malicious email 705 is intercepted by the present technology. Generally, a potentially malicious email 705 is received by an intermediary node 710 prior to delivery to the mail server 715. The potentially malicious email 705 may comprise a link 720 to a potentially malicious resource. The intermediary node 710 may replace the link 720 with an alternate link 725. Additionally, the intermediary node 710 may modify the email to include an indicator 730 that includes at least a portion of the domain associated with the potentially malicious resource (e.g., url=www.spammer.domain). In some instances, the indicator 730 may be displayed in parentheses, or in any other manner that causes the domain of the potentially malicious resource to be set apart or distinctive, and thus more visually distinct to the email recipient. The indicator 730 may be configured for other indications depending on the various applications and user needs.

Figure 8A:
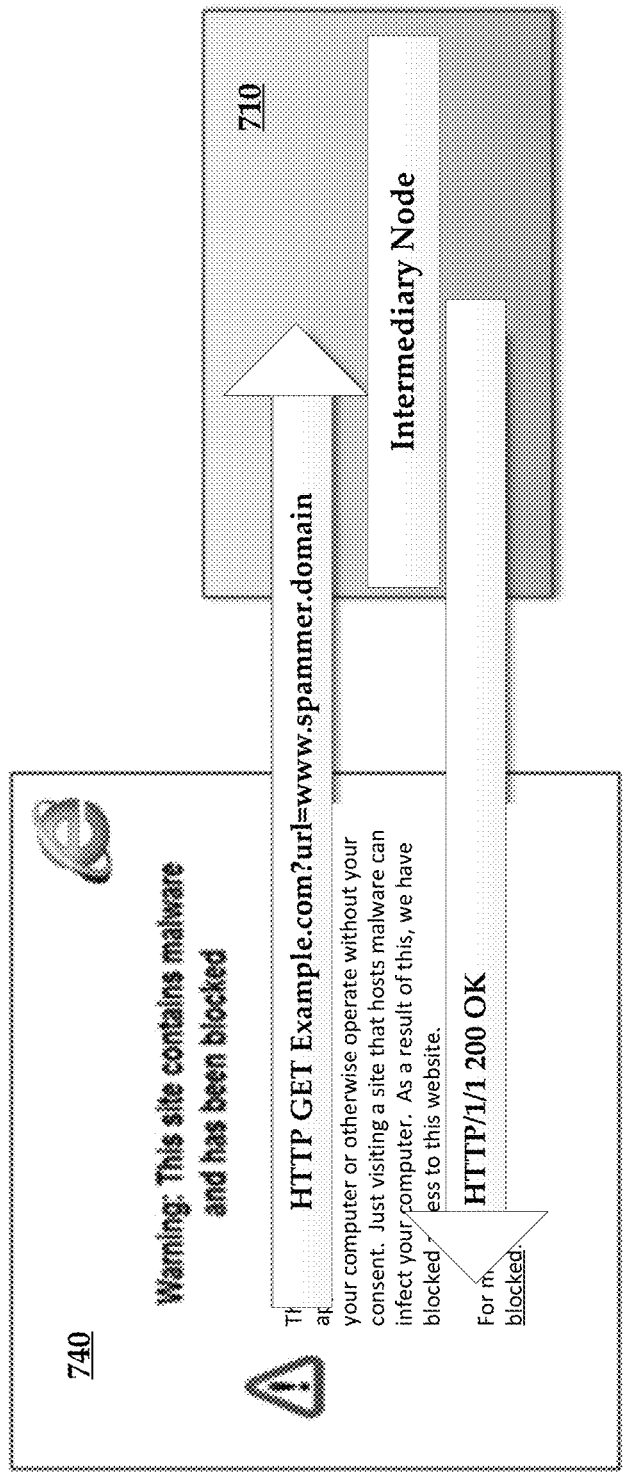
FIG. 8A is a diagrammatical representation of the provision of a landing page.
Figure 8B:
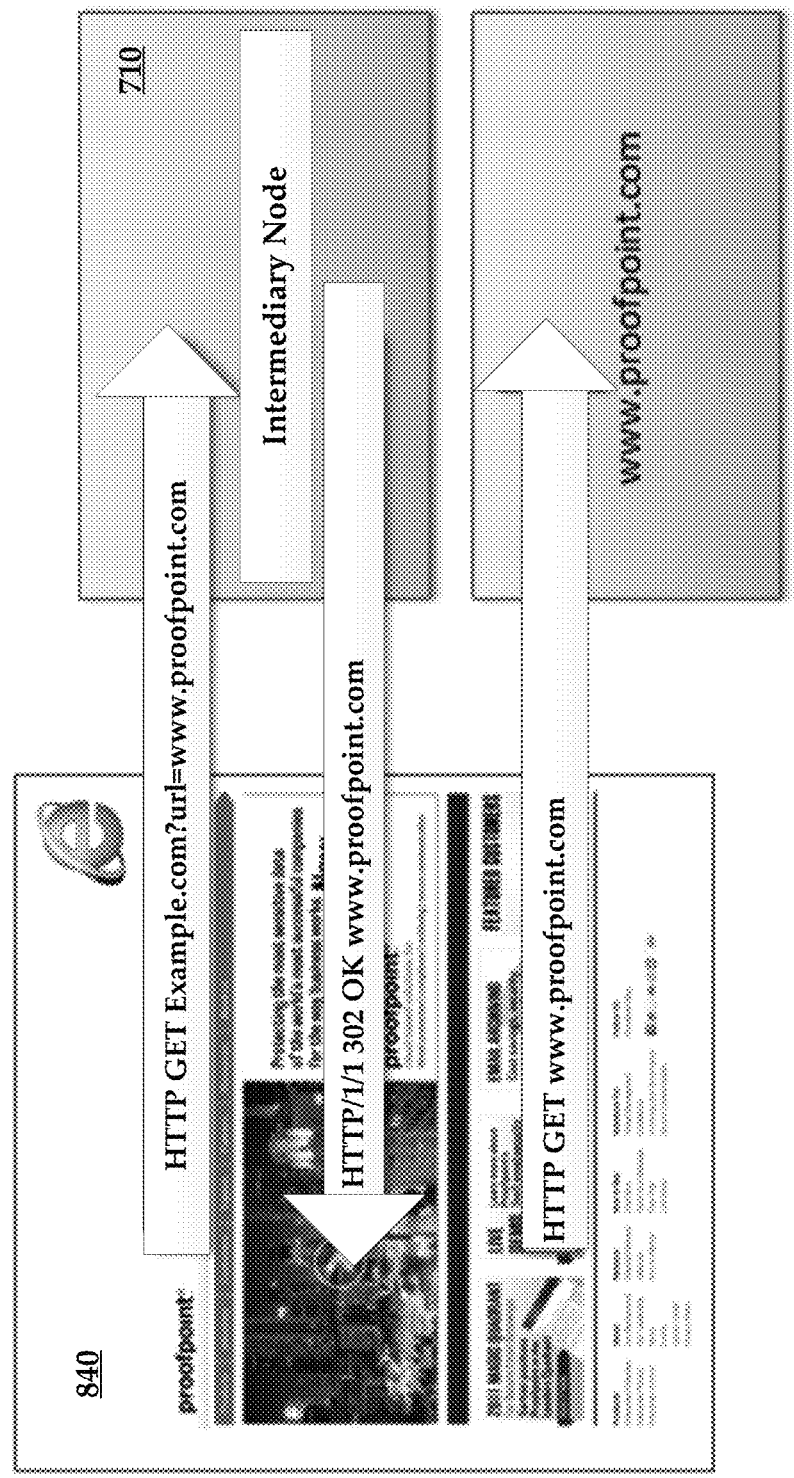
FIG. 8B is a diagrammatical representation of the provision of redirecting to an original link that is determined to be a valid, i.e., not potentially malicious, link.

When the email recipient 735 clicks on the alternate link 725, the intermediary node 710 provides the email recipient with a landing page 740, which in this embodiment comprises a block page notifying the email recipient that the original link was associated with a potentially malicious resource. FIG. 8A illustrates the intermediary node 710 requesting a potentially malicious resource and returning a landing page 740. FIG. 8B illustrates an exemplary embodiment wherein the intermediary node 710 returns a HTTP 302 redirect to the original link determined by the intermediary node 710 to be a valid, i.e., not potentially malicious, link. As shown in this example, it is totally transparent to the end user that clicking the link resulted in contacting the intermediary node 710 first before opening the actual webpage at the link.

Figure 9:
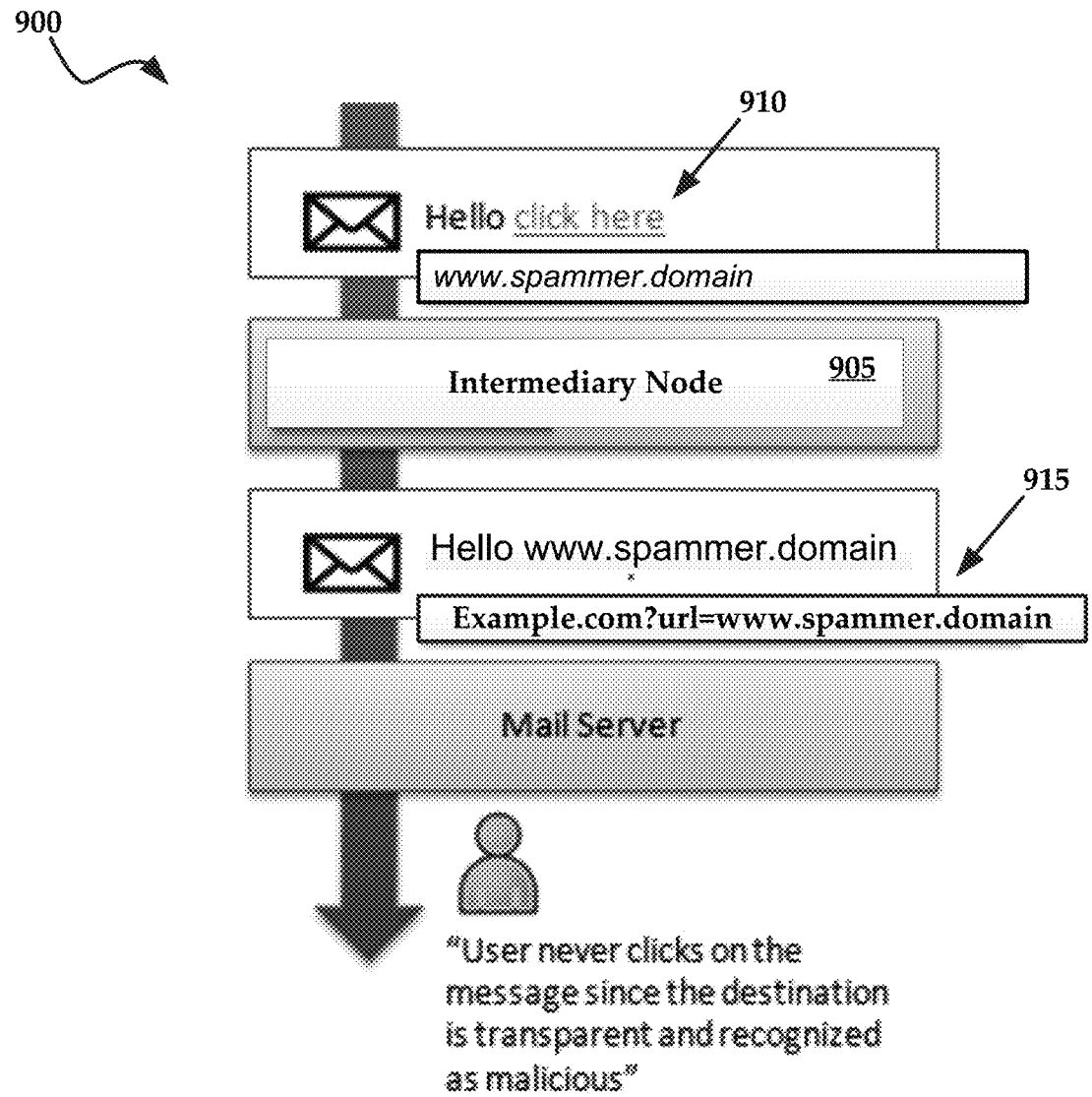
FIG. 9 is another diagrammatical representation of a phishing attack where a malicious email is detected and processed by the present technology.

FIG. 9 is a diagrammatical representation of a phishing attack 900 where a potentially malicious email is intercepted by the present technology. In this instance, an intermediary node 905 may rewrite a link 910 associated with a potentially malicious resource in order to show transparency, e.g., the actual link ("www.spammer.domain"); so the end user can make a better and more informed decision whether to click on this link or not. In some embodiments, the intermediary node 905 may also display an indicator 915 for the link 910.

Figure 10:
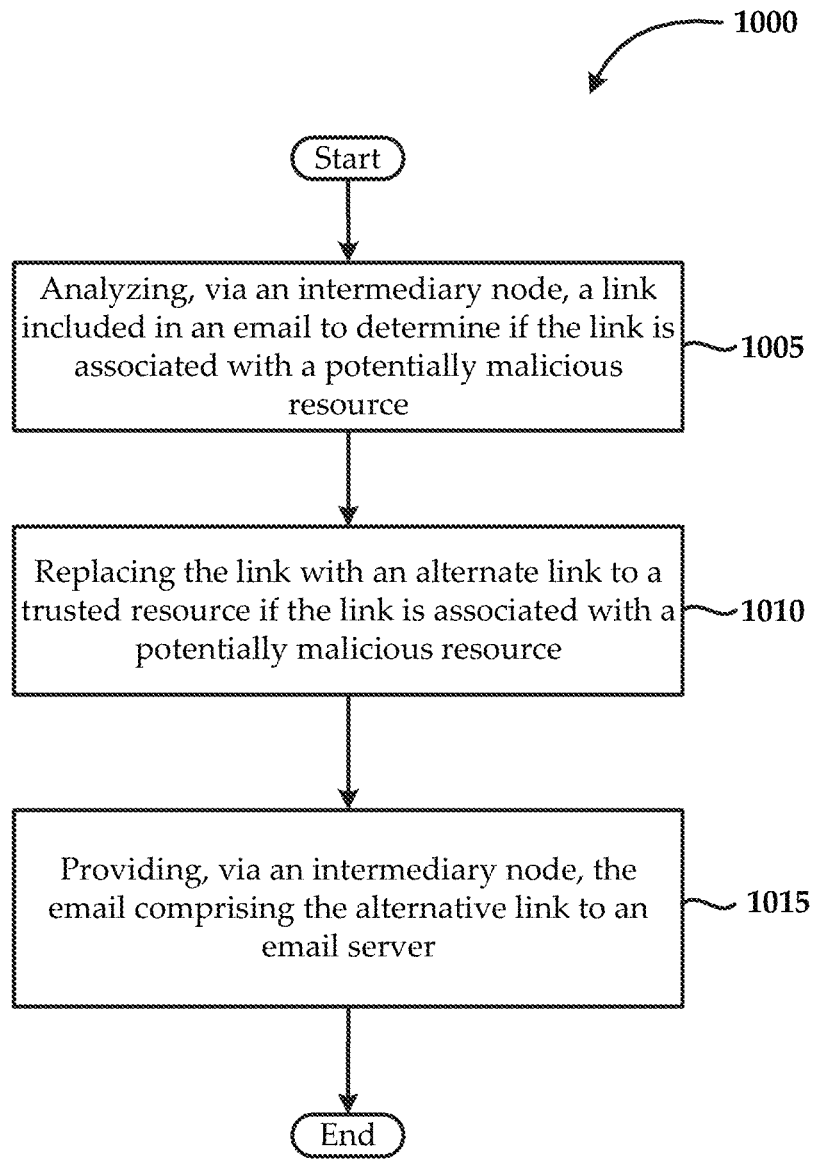
FIG. 10 is a flowchart of an exemplary method for processing emails in accordance with the present disclosure.

FIG. 10 is a flowchart of an exemplary method for processing emails. The method 1000 may comprise a step 1005 of analyzing, via the intermediary node, a link included in an email to determine if the link is associated with a potentially malicious resource. The method may also comprise a step 1010 of replacing the link with an alternate link to a trusted resource if the link is associated with a potentially malicious resource, as well as a step 1015 of providing, via an intermediary node, the email comprising the alternative link to an email server.

Figure 11:
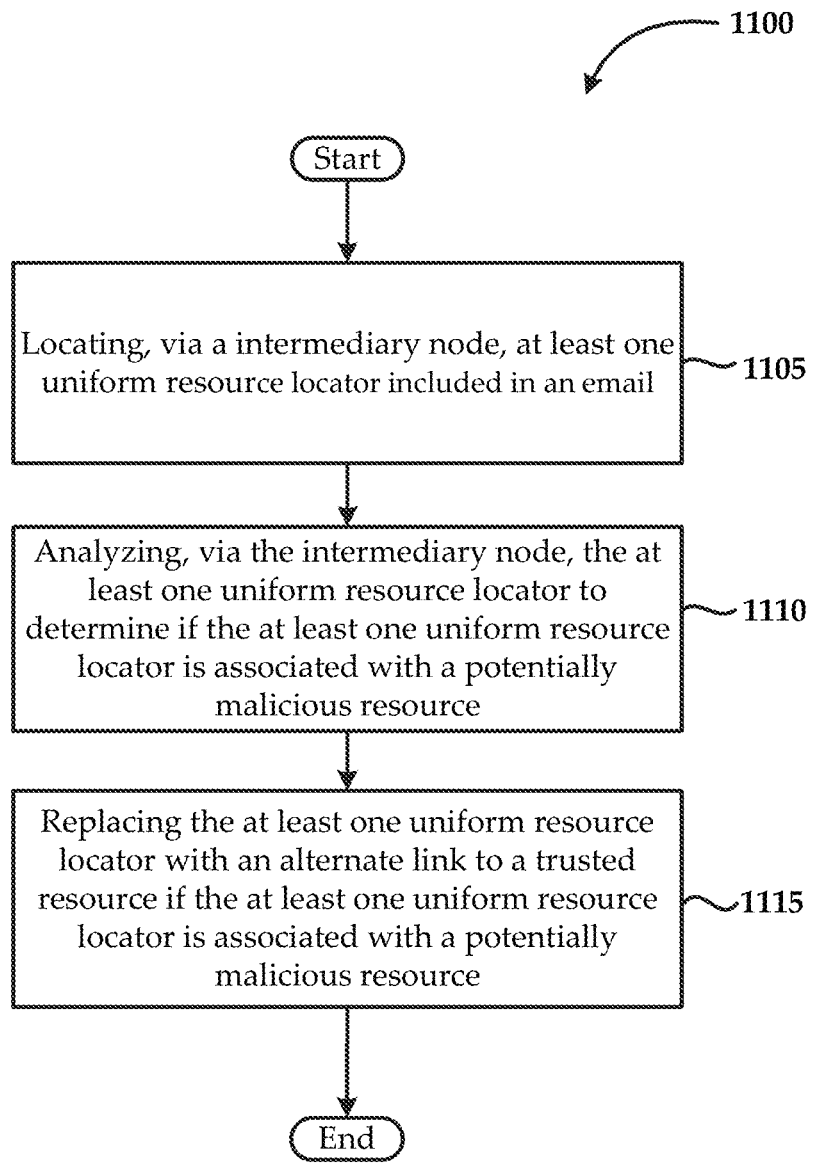
FIG. 11 is a flowchart of another exemplary method for processing emails in accordance with the present disclosure.

FIG. 11 is a flowchart of another exemplary method for processing emails. The method 1100 may comprise a step 1105 of locating, via the intermediary node, at least one uniform resource locator included in an email. The method may also comprise a step 1110 of analyzing, via the intermediary node, the at least one uniform resource locator to determine if the at least one uniform resource locator is associated with a potentially malicious resource, as well as a step 1115 of replacing the at least one uniform resource locator with an alternate link to a trusted resource if the at least one uniform resource locator is associated with a potentially malicious resource.

With regard to the generation of threat insight dashboards, the intermediate node 105 may be configured to track metrics regarding malicious attacks against various targeted resources. That is, the intermediate node 105 may be configured to track descriptive information related to malicious attacks, such as those malicious attacks described above, namely spam, phishing, Trojan horse, and so forth.

One of ordinary skill in the art will appreciate that a malicious attack may be directed towards a targeted resource or a plurality of targeted resources. That is, a malicious attack may be directly targeted or disseminated in a widespread manner. When a malicious attack is distributed in a widespread manner, individual or direct targeting of resources may not occur. For example, a direct targeting of a resource may include a phishing attack against a particular email address or email server. A widespread attack may include, for example, a malicious spam email campaign indiscriminately launched against any available email address. With regard to the present disclosure, a malicious attack against a targeted resource may include both individual/direct targeted attacks and/or widespread malicious attacks.

In general, malicious attack related information may be referred to generally as "metrics." The metrics of a malicious attack may include, but are not limited to: (a) instances where users were exposed to the malicious attack; (b) instances where the cloud-based threat detection system (the intermediary node 105) prevented the user from being exposed to the malicious attack; (c) instances where users actuated the malicious attack; and (d) instances where the cloud-based threat detection system prevented the malicious attack from being actuated. Metrics for a malicious attack may include any combination of the aforementioned metrics.

The "actuation" of a malicious attack will be understood to include any action taken by a user that attempts to launch or execute a malicious attack. For example, an actuation of a phishing attack may include a user filling out a malicious web form.

The intermediary node 105 may be configured to generate various graphs or visual representations of malicious attack metrics. FIGS. 12 and 13 are threat insight dashboards each including one or more exemplary graphs and/or visual representations of metrics regarding a malicious attack.

Figure 12:
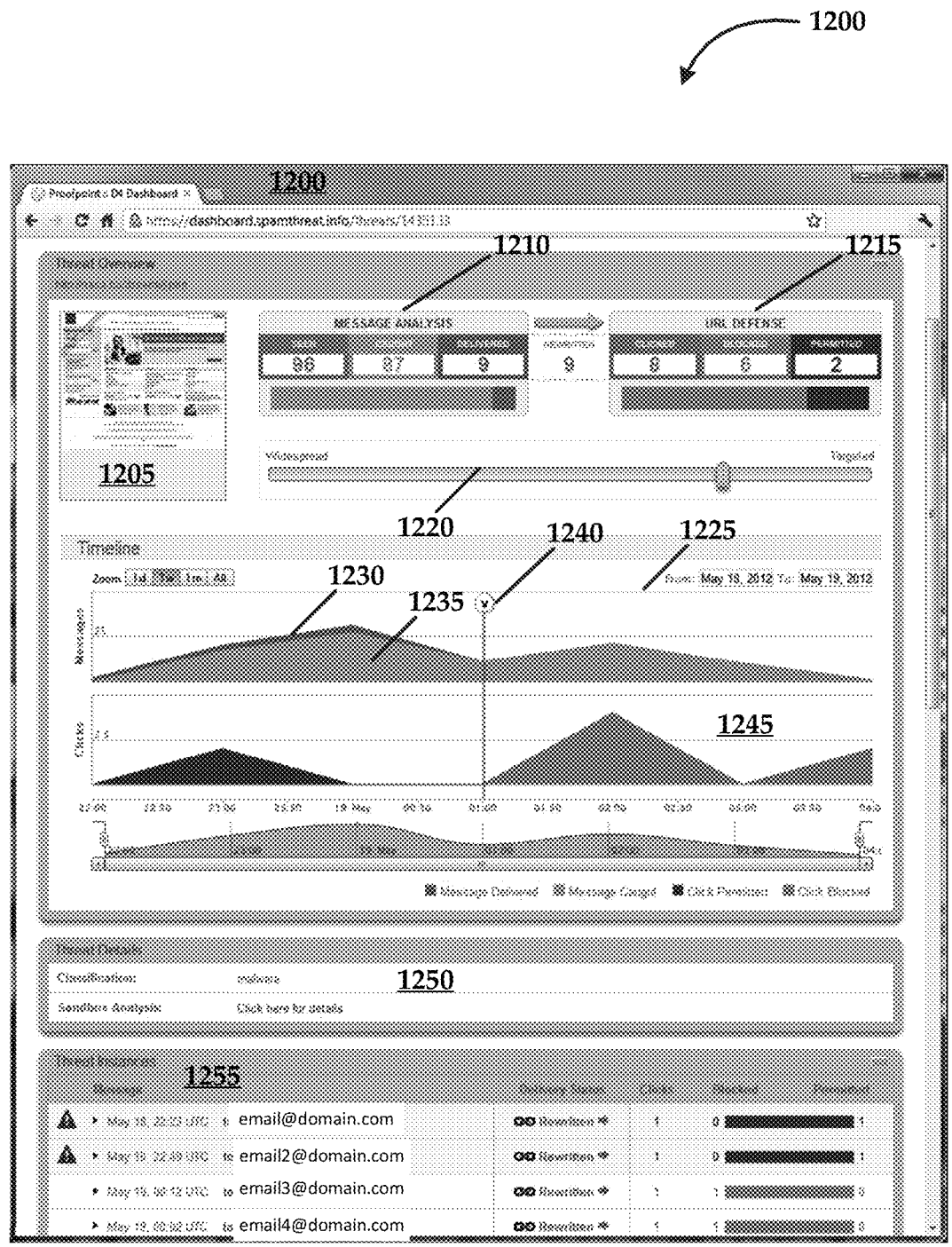
FIG. 12 is an exemplary graphical user interface in the form of a threat insight dashboard.

In more detail, FIG. 12 includes a Threat Insight Dashboard UI 1200. This UI 1200 may be generated by the intermediary node 105. Specifically, the UI 1200 may be generated by the UI module 235 of the intermediary node 105. The UI 1200 has been rendered in a web-browser format suitable for display by the web browser client of the client device (end user computing system) that is being utilized by an end user to both interact with the intermediary node 105 and view threat insight dashboards.

In the example in FIG. 12, the UI 1200 also may include the actual location identifier for the malicious attack, which is specified as "http://nasa.hu/dzsemi/j.php." The UI 1200 also includes a representation of the targeted resource 1205 that was determined by the intermediary node 105 to be compromised by a malicious attack. That is, the intermediary node 105 identified that a malicious attack as being associated with the targeted resource 1205, using any of the malicious detection methods described above.

The UI 1200 may also include a "Message Analysis" counter 1210 that includes metrics such as metrics (a) and (b) described above, as well as a metric related to how many of the (a) instances were not caught by the intermediary node 105 and were permitted to be passed to end users. The UI 1200 may also include a "URL Defense" counter 1215 that includes metrics such as (c) and (d), as well as a metric related to instances where a user actuated a threat and that the threat was actually permitted to execute for the end user. Generally, the URL Defense counter 1215 indicates instances where users have been exposed to a malicious attack. These instances generally occur at the beginning of the malicious attack, before the intermediary node 105 has learned how to identify and neutralize the malicious attack.

The UI 1200 may also include an attack categorization slider 1220 that indicates whether the attacks associated with the malicious attack were, in fact, directly targeted or more widespread. That is, the closer the slider 1220 is positioned towards the targeted end, the more the malicious attack has been categorized by the intermediary node 105 as behaving as a truly targeted attack, meaning a malicious attack has been directed at a particular targeted resource or a group of users. In contrast, a widespread attack is less focused towards a target, being more general and less discriminative in its intended victims.

The UI 1200 may also include two "Timeline" graphs that display various metrics over a given period of time. The time periods displayed are selectable by the user, such that the metrics may be displayed for a single day, a week, or a month, or potentially over a user-defined period of time.

In some instances, the UI may include a two dimensional graph 1225 having a vertical axis defined by exposures to the targeted attack (Messages) and a horizontal axis defined by a period of time. In this instance, the graph 1225 includes instances where users were exposed to the malicious attack such as a malicious email message, and instances where the intermediary node 105 prevented the user from being exposed to the malicious email message. To help visually distinguish metrics, the intermediary node 105 may assign a different hue to each of the metrics. For example, the message exposure metrics 1230 may be shown in a first hue, while the exposure prevented metrics 1235 may be shown in a second hue.

The UI 1200 may also include a threat neutralization indicator 1240 on the graph 1225. The threat neutralization indicator 1240 illustrating a point in time where the intermediary node 105 neutralized the malicious attack. When viewed on a timeline, the user may visually ascertain how long it took for the intermediary node 105 to identify the malicious attack, as well as how long it took for the intermediary node 105 to neutralize the malicious attack, which includes preventing users from being exposed to the malicious attack.

The UI 1200 may also include a second graph 1245 created similarly to the graph 1225 with the exception that the second graph 1245 includes metrics such as instances where users actuated (e.g., clicked) the malicious attack; and (d) instances where the cloud-based threat detection system prevented the malicious attack from being actuated.

The UI 1200 may also include a "Threat Details" pane 1250 that includes descriptive information about the malicious attack. This Threat Details pane 1250 may also include information or metrics gathered about the attack from a sandbox environment. A sandbox environment includes a physical or virtual computing system used as an exemplary environment in which to test and measure the effects of a potentially malicious attack. Information gathered from this testing may be made available to the user through this pane. For example, the user may click on a link that takes the user to a more detailed sandbox analysis page (not shown).

According to some embodiments, the UI 1200 includes a "Threat Instances" List 1255 that includes a list populated with threat instances where users encountered or actuated the malicious attack. In some embodiments, the intermediary node 105 organizes the list such that instances where users actuated the malicious attack are displayed above instances where users encountered but did not actuate the malicious attack. Each row within the Threat Instances list 1255 may include an identifier indicating the email address targeted by the malicious attack and a delivery status indicating if the intermediary node 105 was able to rewrite the malicious message. The Threat Instances list 1255 may also include a column indicating how many times the user clicked on the malicious attack, as well as a column indicating whether the click was "permitted" or "blocked" by the intermediary node 105.

Figure 13:
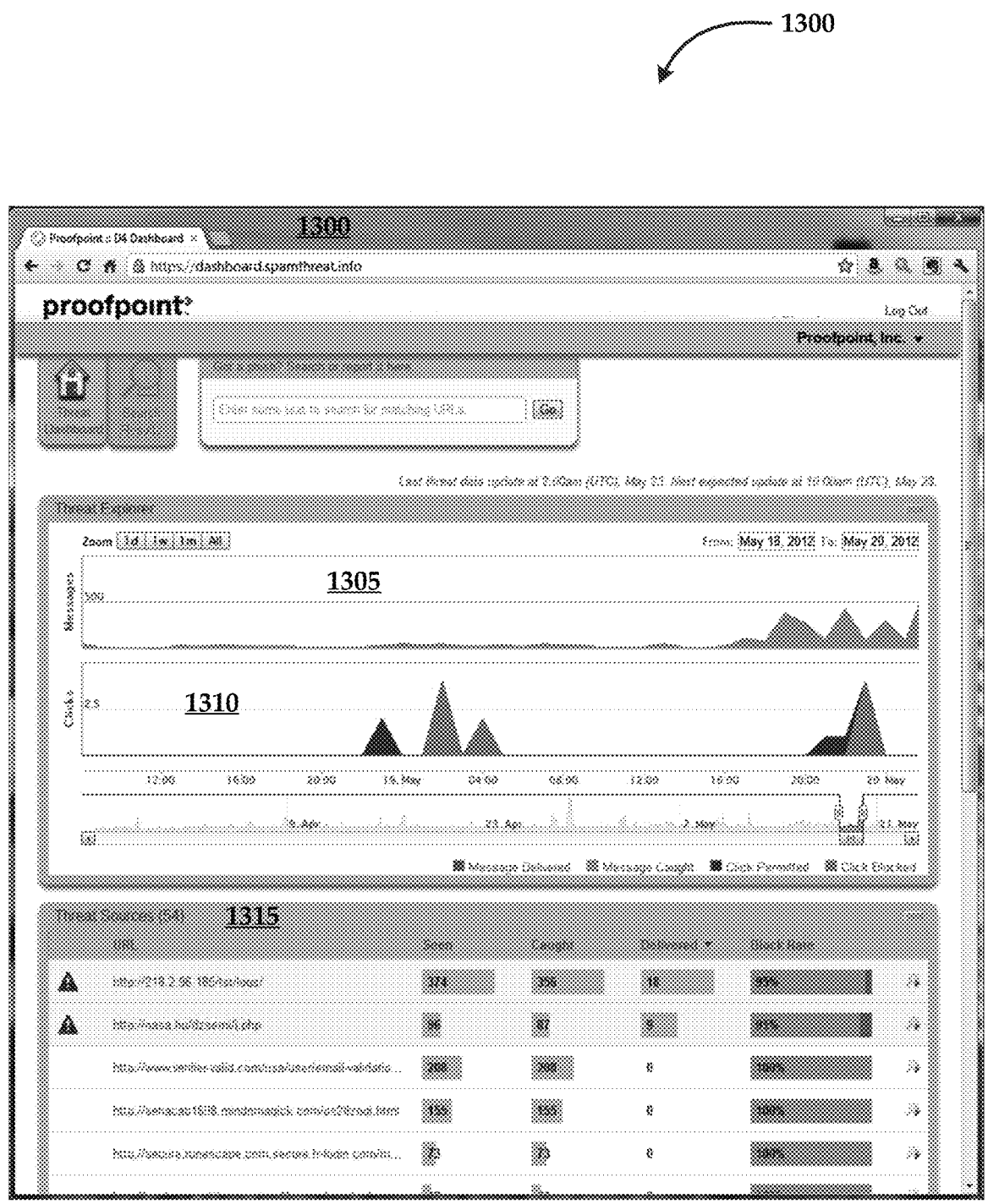
FIG. 13 is another exemplary graphical user interface in the form of a threat insight dashboard.

FIG. 13 illustrates another exemplary threat insight dashboard UI 1300. This UI 1300 includes "Threat Explorer" timeline graphs 1305 ("messages") and 1310 ("clicks"), which are generated by the intermediary node 105 in a manner similar to the graphs of FIG. 12. These threat incidents are organized by the intermediary node 105 according to threat sources, rather than specific malicious attacks that are directed at a targeted resource.

The UI 1300 may include a "threat source" list 1315 that comprises a ranked listing of malicious attack sources. Each row within the threat source list 1315 may include a location identifier for a malicious attack, as well as metrics for the attack, arranged into various columns. For example, for a given malicious attack source, the malicious attack may be seen by users, caught, delivered, or blocked by the intermediary node 105 a certain number of times. In general, these categories of metrics represent categories (a), (b), (c), and (d) described in greater detail above.

The malicious attacks included in the threat source list 1315 may be arranged according to exposure or actuation success. For example, the malicious attacks delivered the most frequently are ranked highest. This information allows the user to quickly identify how successful or dangerous the malicious attack was, relative to the respective end users exposed. The user may return to the dashboard of FIG. 12 to specifically identify the users affected by the malicious attack, That is, the user may reference the Threat Instances list 1255 of FIG. 12 for users associated with a particular email address, which was identified in a malicious attack.

Figure 14:
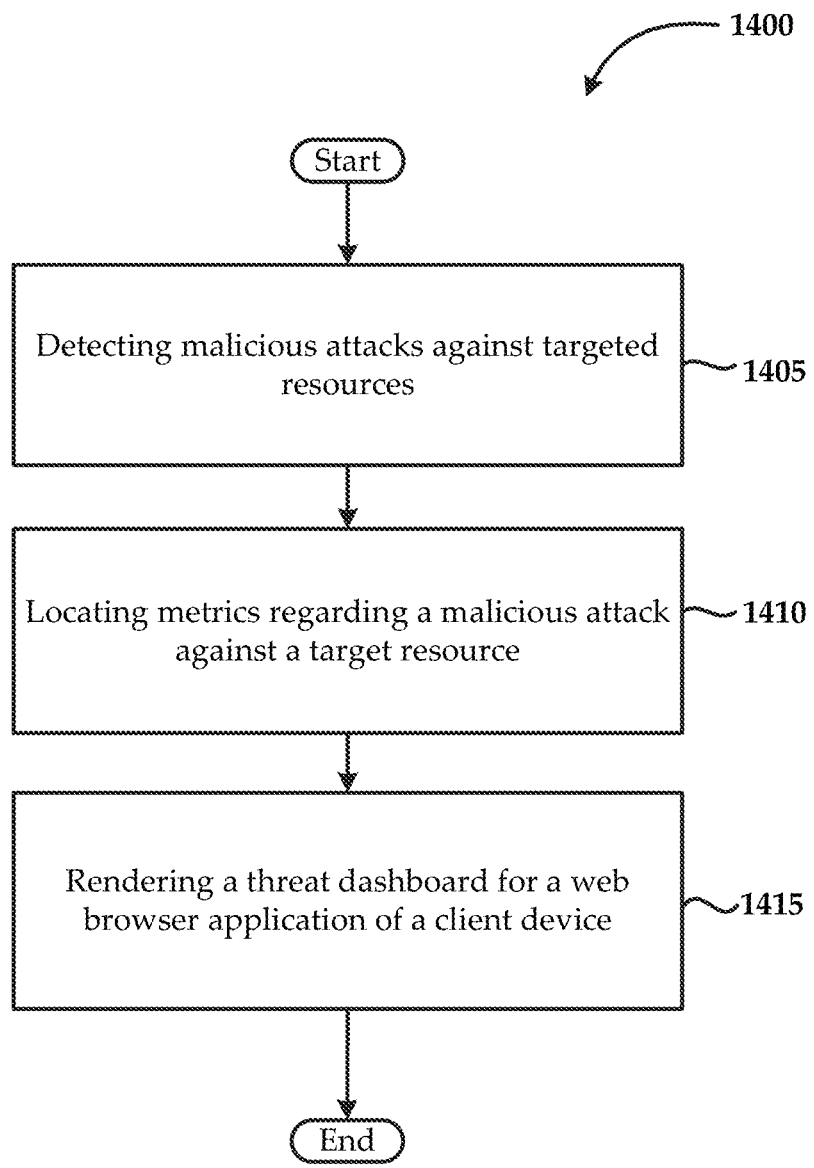
FIG. 14 is a flowchart of an exemplary method for providing a threat dashboard via a cloud-based threat detection system.

FIG. 14 is a flowchart 1400 of an exemplary method for providing a threat dashboard via a cloud-based threat detection system (e.g., an intermediary node 105). The cloud-based threat detection system generally comprises a CPU and a memory. In some instances, the method may include detecting malicious attacks against targeted resources (1405). Again, the malicious attacks may include phishing attacks, spam, Trojan horse attacks, and so forth. The targeted resource may include a web page, an email address, a document, a server, an end user computing device, or other similar resources that would be known to one of ordinary skill in the art as being susceptible to malicious attacks.

The method may also include locating metrics regarding a malicious attack against a targeted resource (1410). As described in greater detail above, the metrics indicate instances where users were exposed to the malicious attack or instances where the cloud-based threat detection system prevented the user from being exposed to the malicious attack.

The method may also include rendering a threat dashboard for a web browser application of a client device (1415). It will be understood that the threat dashboard comprises the located metrics.

In general, various embodiments of the present disclosure pertain to methods for selective filtering of unsolicited emails such as unwanted emails, advertisement emails, spam emails, emails containing malicious content or attachments, and so forth. While conventional technologies for filtering unsolicited emails are mostly directed to understanding unsolicited emails to prevent their receipt in the future, the present technology is directed to analyzing otherwise legitimate emails to understand normal trends and behaviors. Criteria associated with historical trends and behaviors can be used to classify emails and identify those outside of such historical trends. This proactive technique may use various heuristic algorithms and provide faster and more reliable methods for filtering unsolicited emails compared to the conventional filtering techniques.

More specifically, the present technology involves aggregation of historical email data associated with a particular email user or a group of email users pertaining to a particular organization, as an example. The historical email data may be aggregated and analyzed dynamically, for example, every time a new email is received. Based on such analysis, at least one trusted trend may be determined. The trusted trends may include a number of various criteria having certain attributes. The attributes may include user side attributes, infrastructure attributes, company attributes, email attributes, and trending attributes. Particular examples of these attributes will be provided in greater detail below. The attributes may be monitored using various machine learning algorithms, heuristic algorithms, or neural network algorithms, which can be trained every time a new email is received or sent. Basically, these algorithms may be trained to understand what "normal" behaviors and trends of email user activity are so that every new email may be assessed based on known "normal" patterns. If a new email is outside of such patterns, it may be considered suspicious and certain defensive actions may be taken with respect to the new email. More specifically, when the new email is received, a score may be calculated based on the trusted trends criteria. Thereafter, it may be determined whether this score is above (or below) a predetermined threshold score. If the score is above the predetermined threshold score, the new email can be filtered, for example, deleted, placed into a quarantine zone, marked as "suspicious", "spam", "junk" email, or redirected to a sandbox. These principles will be now described in greater detail by referring to the accompanying drawings.

Figure 15:
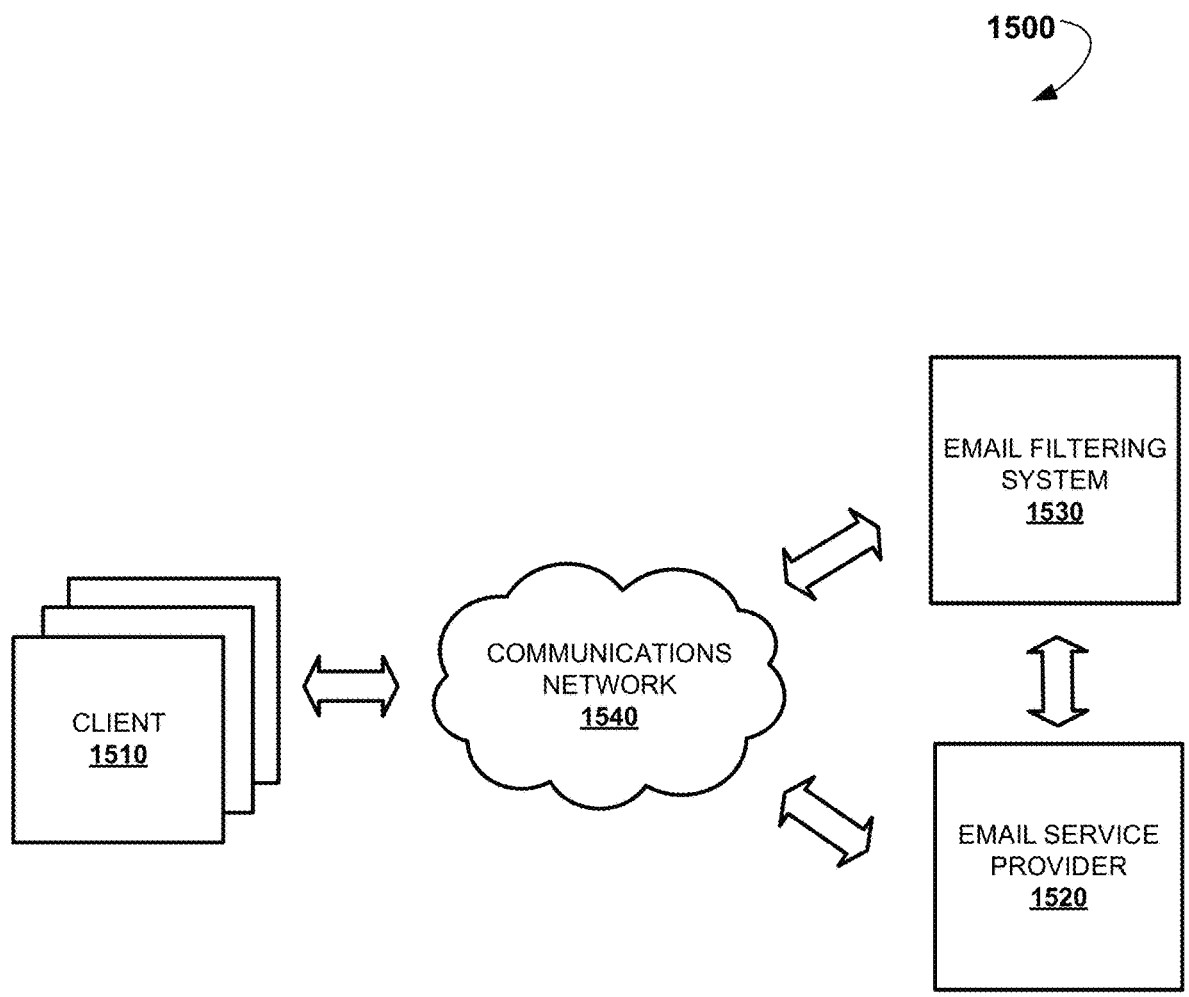
FIG. 15 shows a high-level block diagram of an example system environment suitable for implementing the present technologies for filtering unsolicited emails.

FIG. 15 shows a high-level block diagram of an example system environment 1500 suitable for practicing the present technologies for filtering unsolicited emails. The system environment 1500 may include one or more clients 1510, an email service provider 1520, an email filtering service 1530, and a communications network 1540.

According to various embodiments, the clients 1510 include various clients in "client-server environments". In other words, the clients 1510 may include computers operated by email users. The computers may include desktop computers, laptop computers, tablet computers, smart phones, wireless telephones, gaming consoles, television systems, and other electronic devices having networked connectivity and able to receive or send emails over the communication network 1540. The clients may include email agents (also known as email clients, email readers, and mail user agents) installed thereon for accessing and managing user's emails.

The email service provider 1520 may include software which enables email servers to send, receive, and store emails associated with organizations and/or individual users. The email service provider 1520 may provide web mail services to the public in general for personal use (e.g., Hotmail® or Gmail®) or provide services exclusively to its members, subscribers, employees, professional organizations, and so forth. The email service provider 1520 may be a part of a large organization whose primary function is not providing web email services but providing other services such as network connectivity. For example, an Internet Service Provider (ISP) may be mainly concerned with providing Internet access to users but provide email services as a convenience. Users may typically access their email via webmail, POP3 or IMAP protocols depending on the architecture and policies of the email service provider 1520.

The email filtering system 1530 may be configured to implement algorithms for filtering unsolicited emails according to the example methods described herein. As shown in FIG. 15, the email filtering system 1530 may be implemented as a web (e.g., cloud-based) service running on one or more stand alone servers such that it may track and control email flow from and to the clients 1510.

The communications network 1540 may include a wireless or wire network, or a combination thereof. For example, the network may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, dial-up port such as a V.90, V.34 or V.34bis analog modem connection, cable modem, ATM (Asynchronous Transfer Mode) connection, or an FDDI (Fiber Distributed Data Interface) or CDDI (Copper Distributed Data Interface) connection. Furthermore, the communications may also include links to any of a variety of wireless networks including, WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection, mesh or Digi® networking.

Figure 16:
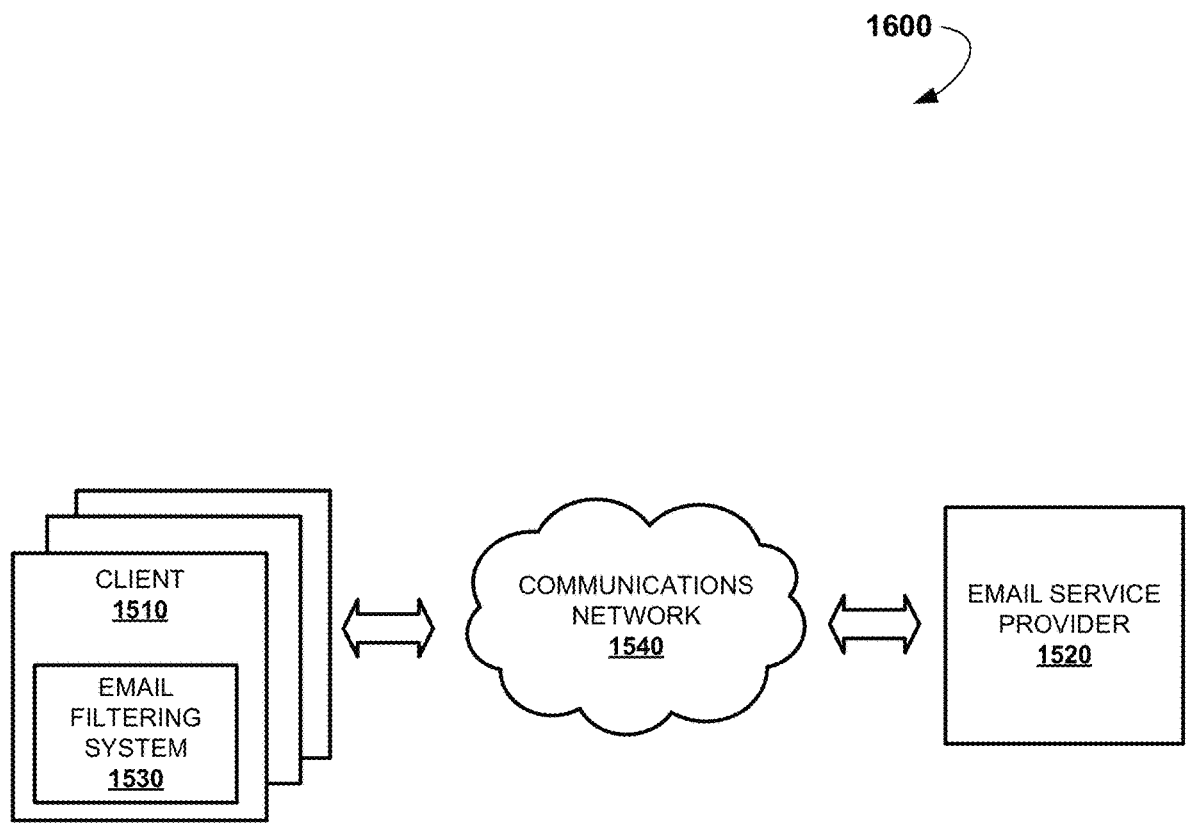
FIG. 16 shows a high-level block diagram of another example system environment suitable for practicing the present technologies.

FIG. 16 shows a high-level block diagram of another example system environment 1600 suitable for practicing the present technologies for filtering unsolicited emails. In particular, in this embodiment, the email filtering system 1530 is implemented as a software application being a part of mail agents installed on the clients 1510. Alternatively, the email filtering system 1530 may refer to a stand alone software application working in cooperation with the mail agents installed on the clients 1510.

Figure 17:
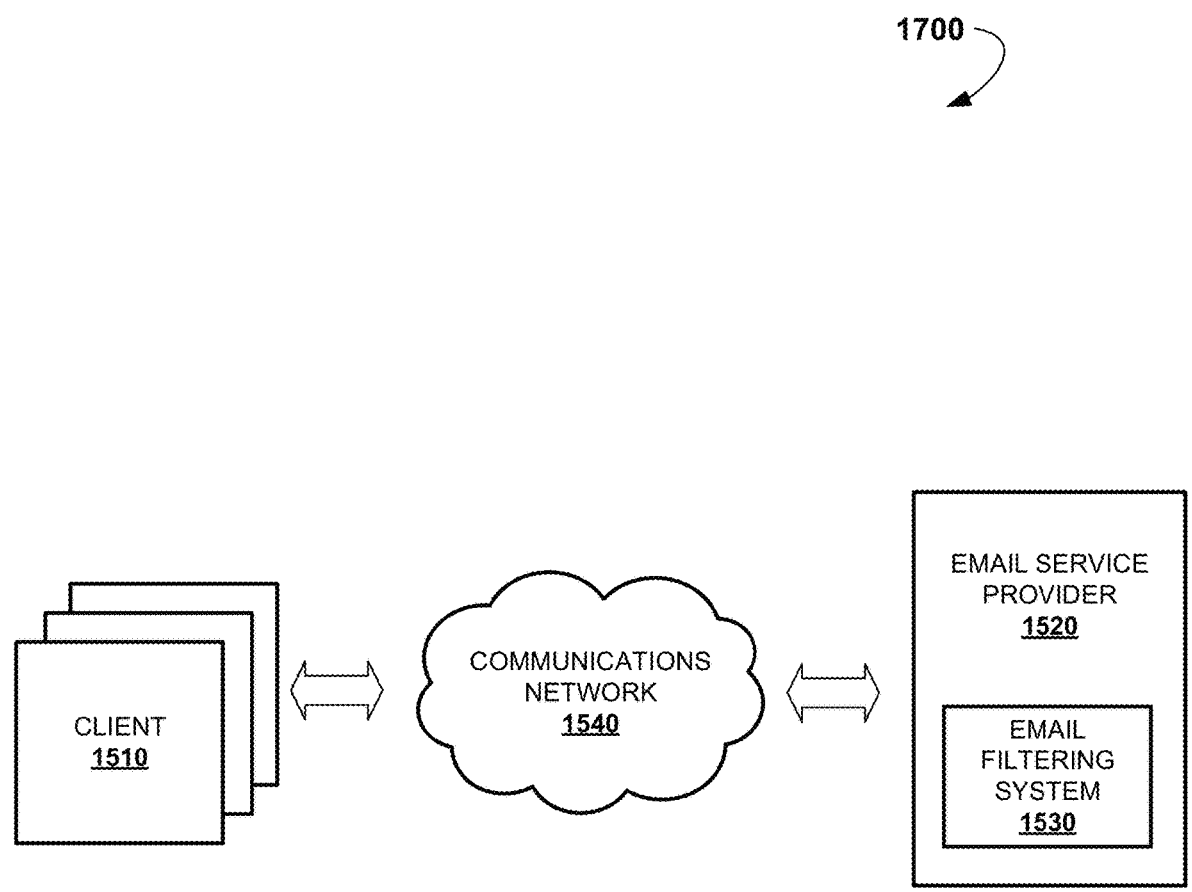
FIG. 17 shows a high-level block diagram of yet another example system environment suitable for practicing the present technologies.

FIG. 17 shows a high-level block diagram of yet another example of system environment 1700 suitable for practicing the present technologies for filtering unsolicited emails. In particular, in this embodiment, the email filtering system 1530 is implemented as a software application integrated into the email service provider 1520 or software application being a part of the email service provider 1520.

In either case, the email filtering system 1530 may perform the methods directed to email filtering described herein with respect to various embodiments.

Figure 18:
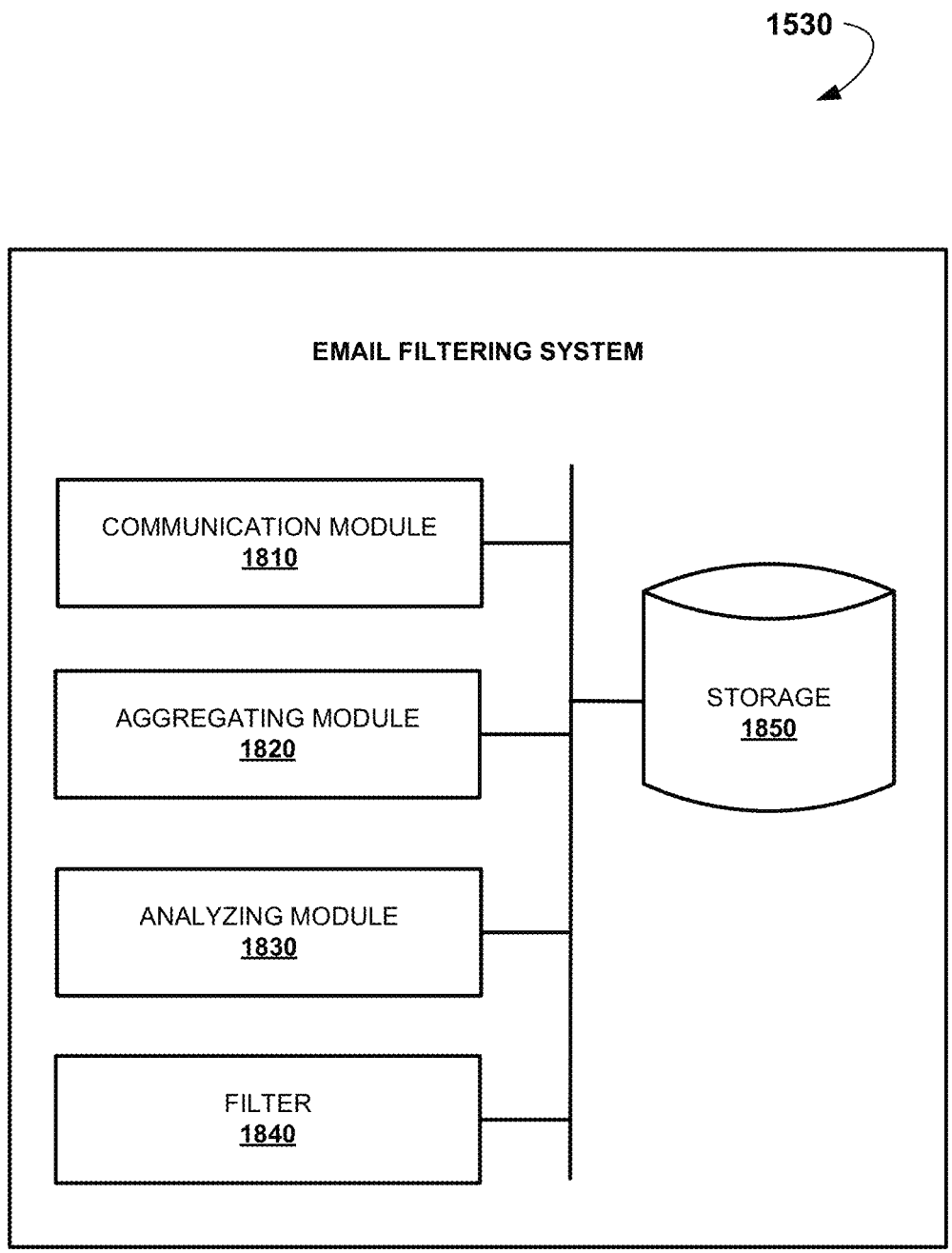
FIG. 18 shows an example high-level block diagram of an email filtering system, according to an example embodiment.

FIG. 18 shows an example high-level block diagram of the email filtering system 1530. As shown in the figure, the email filtering system 1530 may include a communication module 1810, an aggregating module 1820, an analyzing module 1830, a filter 1840, and a storage 1850. It should be mentioned that the above modules may be realized as software or virtual components, hardware components, or a combination of thereof.

According to one or more embodiments, the communication module 1810 may be configured to send electronic messages over the communications network 1540 toward the email service provider 1520 and/or the clients 1510, or receive messages from these addressees. For example, every new email assigned for a particular user received by the email service provider 1520 may be, at first, sent to the email filtering system 1530, which then determines whether the new email is an unsolicited email, and if yes, the new email can be redirected back to the email service provider 1520 or the email service provider 1520 may be notified otherwise. In other words, the email filtering system 1530 may determine that the new email is an unsolicited and/or malicious email and, therefore, to be filtered or blocked. In such case, the email filtering system 1530 may inform the email service provider 1520 that the new email was deleted, filtered, blocked, placed into a sandbox or inform the email service provider 1520 that a suspicious URL was replaced with a safe URL, and so forth. The communication module 1810 may be also configured to provide communication among the remaining modules and units of the email filtering system 1530.

According to one or more embodiments, the aggregating module 1820 may be configured to dynamically aggregate historical email data associated with one or more users. The historical email data may include emails received sent by the one or more users. The historical email data may be updated regularly, e.g., every time when a new email is received or sent out.

In one embodiment, the aggregating module 1820 may aggregate only specific parameters of the received and sent emails. For example, it may aggregate only metadata associated with the email, including, for example, a sender address, a sender name, a recipient address, a recipient name, a time and a date of communication, a route, a content type, a size, a number and parameters of attachments, a number of sender addresses, a number of recipient addresses, and so forth. The aggregated information which may include the entire emails or store specific parameters of the emails in the storage 1850.

According to one or more embodiments, the analyzing module 1830 may be configured to analyze the historical email data aggregated by the aggregating module 1820. The analysis of the historical email data may be utilized to provide one or more trusted trends criteria. In general, the trusted trends criteria may include patterns associated with "normal" and "trusted" email activity behaviors associated with a particular user or a group of users. The trusted trends criteria may include one or more attributes associated with the historical email data. These attributes may include user side attributes, infrastructure attributes, company attributes, email attributes, trending attributes, and so forth. Generally speaking, these attributes may reflect features or characteristics of aggregated historical email data. For example, these attributes may include the following attributes:

(1) User Side Attributes:
a number of emails by size,
a number of emails by time of day,
a number of recipients per email,
a number of emails per mail user agent,
a number of emails by language,
a number of emails by character set,
a number of emails by number of attachments,
a number of emails by content type,
a number of emails having a header and a number of emails lacking a header,
a receive to send ratio by address,
a number of emails received by address,
a number of emails sent to by address,
a percentage of unsolicited emails received, etc.

(2) Infrastructure Attributes:
a number of IP addresses in an ASN,
an email volume per IP,
a number of domains per the ASN,
a number of emails by size,
a number of sent and received emails per time of day,
a number of recipients per email, etc.

(3) Company Attributes:
a number of IP addresses in the ASN,
a number of sending TLDs,
a number of sent and received emails per time of day,
a number of emails received per domain,
a number of emails received per sender, etc.

(4) Email Attributes:
a number of headers per email,
a number of recipients,
a number of emails per language,
a number of emails by character set,
a number of emails by country,
a number of emails by number of attachments,
a number of emails by content type, etc.

(5) Trending Attributes:
a number of emails by an IP address,
a number of emails to a target by an IP address,
a number of URLs per email, etc.

(6) URL-centric Attributes:
a number of emails in which a particular URL appears In addition, global aggregates may be used as an attribute. For example, if the overall percentage of malicious emails in all the world goes down by a large amount, e.g., 90%, at a given time, any particular email may be considered less likely to be unwanted by the recipient.

The analyzing module 1830 may be configured to track all or some of these attributes to build and dynamically update behavioral patterns and trusted trends which are then used for assessing new emails. According to one or more embodiments, these trusted trends can be generated using various machine learning algorithms such as heuristic methods, artificial intelligence systems, neural networks, or other experience-based (e.g., trainable) techniques for determining general trends, behavioral data, and other characteristics.

According to one or more embodiments, the monitored attributes, trends and behavioral information can be used by the analyzing module 1830 to generate virtual "circles of trust". The circles of trust may include information with respect to a particular email user including trusted addressee from which that email user may safely receive emails. Further, this trusted addressee may also consider the email user as a "trusted addressee". In other words, this principle may be expressed as "your friends are my friends".

Figure 19:
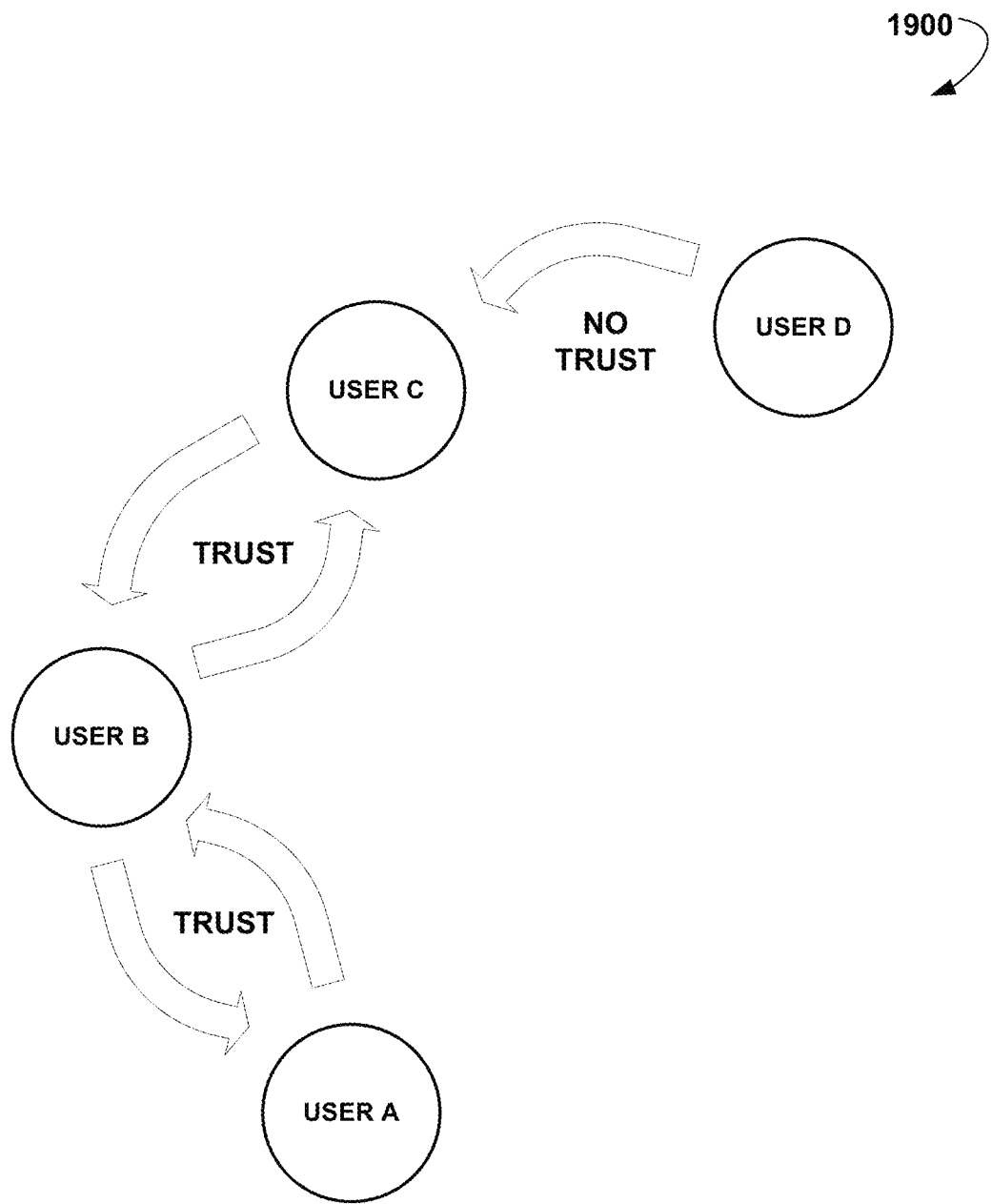
FIG. 19 shows a simplified diagram of trust circles, according to an example embodiment.

FIG. 19 shows a simplified diagram 1900 of such circles of trust. As shown in this figure, there are four email users A, B, C, and D. The user A trusts the user B, and vice versa. The user C trusts the user B, and vice versa. It means that the user C may be considered a trusted addressee for the user A, and vice versa. The user D may have no past relationship with any of these users, and thus it will not be considered a trusted addressee for any of these users. Accordingly, the circles of trust can be generated for email users for which historical email data is aggregated and analyzed. It should be understood that any new emails may be analyzed based on the circles of trust.

According to one or more embodiments, the filter 1840 may be configured to assess every new email and determine whether or not the email is an unsolicited email, and if so, block or filter it according to one or more predetermined rules or scenarios. More specifically, the filter 1840 may calculate a score with respect to new emails based on determination as to how the new email meets and matches the trusted trends criteria discussed above. In an example, the higher the score, the more probable it is that the received email is an unsolicited email, and vice versa. When the score is above (or below) a predetermined threshold score, the email may be blocked, deleted, marked as "spam," "junk," "unsolicited" email or similarly, placed into a sandbox or quarantined, and so forth. The severity of taken actions may depend on a particular score. For example, if the score is just above a first threshold score, the email may be merely marked as "suspicious" email, however, if the email is above a higher, second threshold, the email may be deleted. Those skilled in the art will appreciate that various filtering techniques may be implemented depending on the current needs, system design and particular application.

In other words, the filter 1840 may perform assessment of every new email to determine how "normal" it is. For example, the fact that a particular user within a company or a group of other users from the same company has sent emails to a particular addressee would be considered, by the analyzing module 1830, a strong indication that this addressee is likely to be trusted. Thus, when the user of the company or any other user of the same company receives an email from that addressee, such email will be considered, by the filter 1840, a "normal" email and it would not be blocked.

In another example, a particular user within a company may receive an email from an addressee, but one or more statements are true: neither this user nor any other user from the same company has sent emails to this addressee or addressee domain, addressee IP has unknown reputation, addressee IP is associated with a suspicious registrar, addressee IP was registered less than 24 hours ago, the source has sent over than five emails in five minutes to users from the same company. If any of these statements are true the filter may classify the new email as an unsolicited email and block it because it is not consistent with the "normal" trends.

The above scenarios are just a few examples of cooperative operation of the analyzing module 1830 and the filter 1840. In general, as will be appreciated by those skilled in the art, multiple attributes and corresponding trends/behavioral information may be monitored and applied to a new email. For simplicity, it can be said that the analyzing module 1830 and the filter 1840 are designed to answer the following example questions:

(1) Checking Sending Systems Questions:
Do behavioral patterns match a well-behaving system?
Do behavioral patterns match the stated sending system?
(2) Checking Sending Companies Questions:
Has the recipient sent emails to any address at the sending company?
Has anyone inside of receiving company sent emails to any address at the sending company?
Do behavioral patterns match the stated sending company?
(3) Checking Senders Questions:
Has a particular recipient sent email to a particular sender?
Has anyone inside of receiving company sent emails to the sender?
What percentage of unsolicited emails originates with this sender?
What is the send to response rate for this sender?
(4) Checking Receivers Questions:
What percentage of unsolicited emails does this receiver receive?
What is the send to response rate for this receiver?
Has the recipient sent emails to the sender?
Has the recipient sent emails to the sending company?
(5) Checking Email Questions:
Does it contain features that map to emerging behavioral trends?
Does it contain features that doesn't map to existing behavioral trends?

Figure 20:
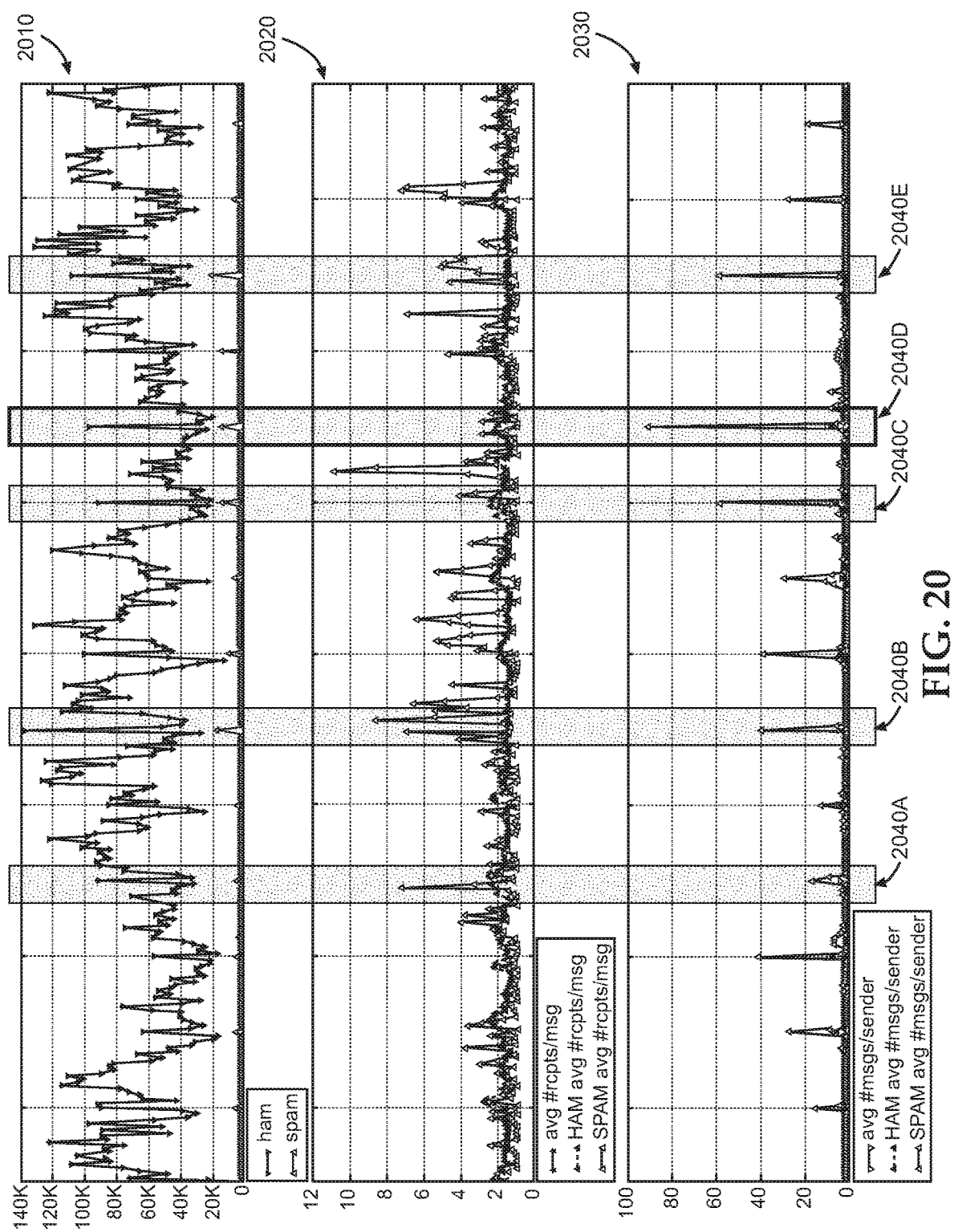
FIG. 20 shows three example charts illustrating various monitored attributes for a particular email user.

To further illustrate the principles of operations of the email filtering system 1530, reference is now made to FIG. 20. This figure shows three example charts 2010, 2020, 2030 showing various monitored attributes for a particular email user. In particular, the chart 2010 shows dynamics of a number of "ham" or regular emails and a number of "spam" or unsolicited emails received by a particular email user over a period of time. The chart 2020 shows dynamics of an average number of recipients per email received by the same user over the same period of time. The chart 2030 shows dynamics of an average number of emails per sender. Grey rectangles 2040A-2040E illustrate various anomalies in the normal behaviors and trends. For example, the first rectangle 2040A illustrates that an email having a larger than usual number of recipients was received from a sender and this sender has sent a larger than usual number of emails. At least these abnormal parameters may lead to the determination that the particular email is an unsolicited email. Similarly, other unsolicited emails have been identified and filtered.

Figure 21:
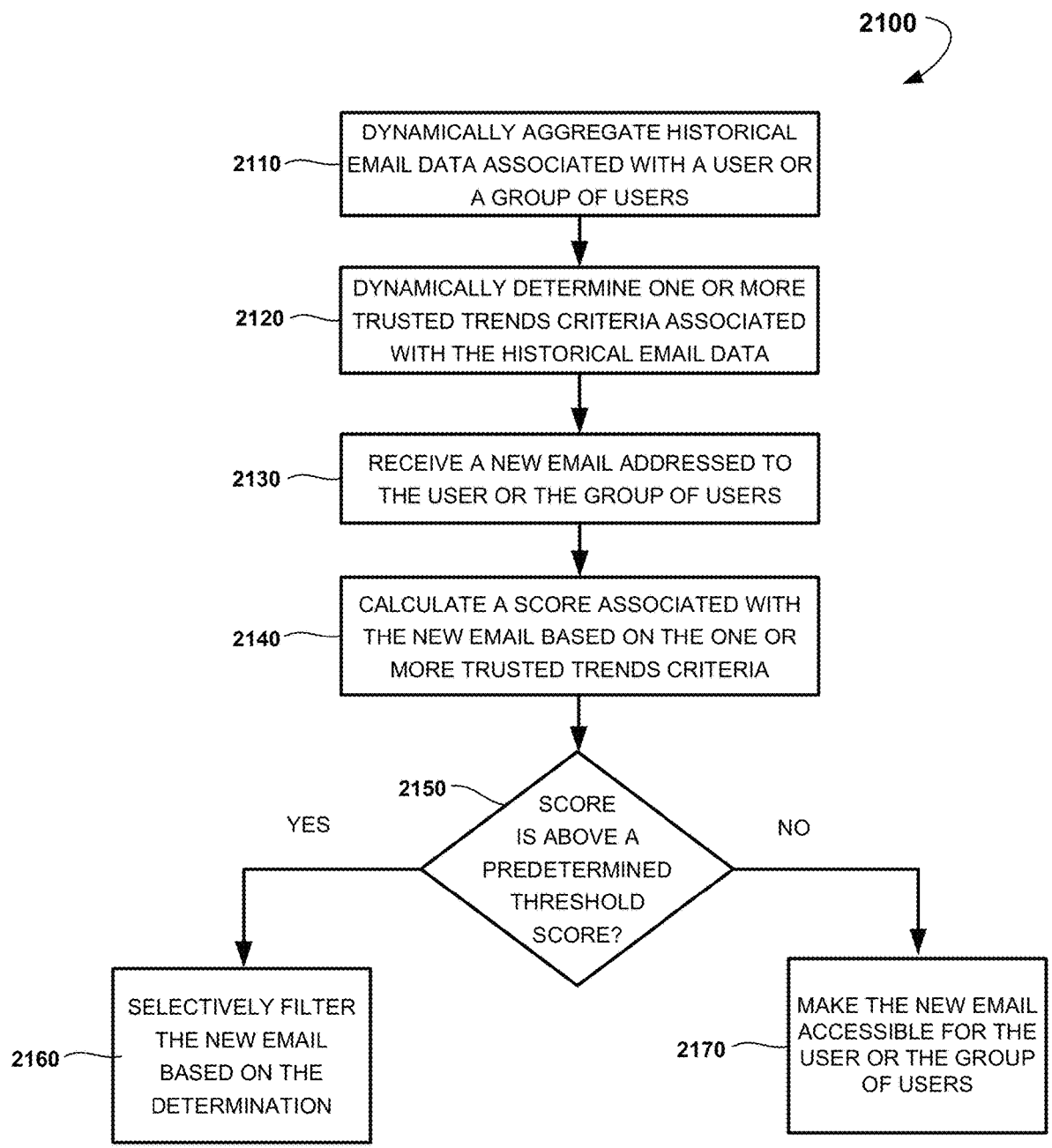
FIG. 21 is a process flow diagram showing a method for filtering unsolicited emails, according to an example embodiment.

FIG. 21 is a process flow diagram showing a method 2100 for filtering unsolicited emails according to one or more example embodiments. The method 2100 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the email filtering system 1530. In other words, the method 2100 can be performed by various units discussed above with reference to FIG. 18.

As shown in FIG. 21, the method 2100 may commence at operation 2110, with the aggregating module 1820 dynamically aggregating historical email data, which may include emails associated with a particular user or group of users. The historical email data can be aggregated repeatedly, for example, every time a new email is received or sent by the particular user or a group of users. The historical email data can either relate to entire emails or its parts such as various email parameters or metadata.

At operation 2120, the analyzing module 1830 may dynamically determine one or more trusted trends criteria associated with the historical email data. The trusted trends criteria may include one or more attributes associated with the historical email data and may relate, generally, to various aspect of the email itself, sender or recipient parameters. The attributes may include user side attributes, infrastructure attributes, company attributes, email attributes, trending attributes, and so forth. Some examples of such attributes may include a number of emails by size, a number of emails by time of day, a number of recipients per email, a number of emails per mail user agent, a number of emails by language, a number of emails by character set, a number of emails by number of attachments, a number of emails by content type, a number of emails having a header and a number of emails lacking a header, a receive to send ratio by address, a number of emails received by address, a number of emails sent to by address, a percentage of unsolicited emails received, and so forth.

The trusted trends criteria, in other words, may constitute behavioral patterns and trends related to "normal" email activity of the given user of group of users. Such behavioral patterns may be further used to assess abnormal activity in email traffic. As has been described above, the behavioral patterns and trends can be generated by various machine learning algorithms including heuristic algorithms, artificial intelligence algorithms, neural network algorithms, and so forth.

At operation 2130, the communication module 1810 may receive a new email addressed to the user or the group of users or at least one user of the group of users.

At operation 2140, the filter 1840 may analyze the new email by determining how it meets or matches the "normal" behavioral patterns and trends. In particular, the filter 1840 may calculate a score associated with the new email based on the one or more trusted trends criteria determined at the operation 2120. The filter 1840 may match the new email to the "normal" behavioral patterns and trends and calculate the score based on the "similarity" between the new email attributes and the attributes associated with the determined behavioral patterns and trends.

At operation 2150, the filter 1840 may determine that the score is above (or below) a predetermined threshold score.

At operation 2160, the filter 1840, based on the determination, may selectively filter the new email. The filtering may include blocking, deleting, placing the new email into a quarantine zone, redirecting the new email to a sandbox, replacing suspicious URLs with safe URLs, marking the new email as "spam," "junk," "suspicious," "unsolicited" email, and so forth.

Alternatively, at operation 2170, based on the determination, by the filter 1840, that the score is within predetermined threshold score limits, the new email can be made accessible for the user or the group of users.

The example embodiments described herein can be implemented in an operating environment comprising computer-executable instructions (e.g., software) installed on a computer, in hardware, or in a combination of software and hardware. Alternatively, the executable instructions may be stored onto a non-transitory processor-readable medium. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Java, C, C++, C#, .NET, PHP, Perl, UNIX Shell, Visual Basic or Visual Basic Script, or other compilers, assemblers, interpreters, or other computer languages or platforms.

Figure 22:
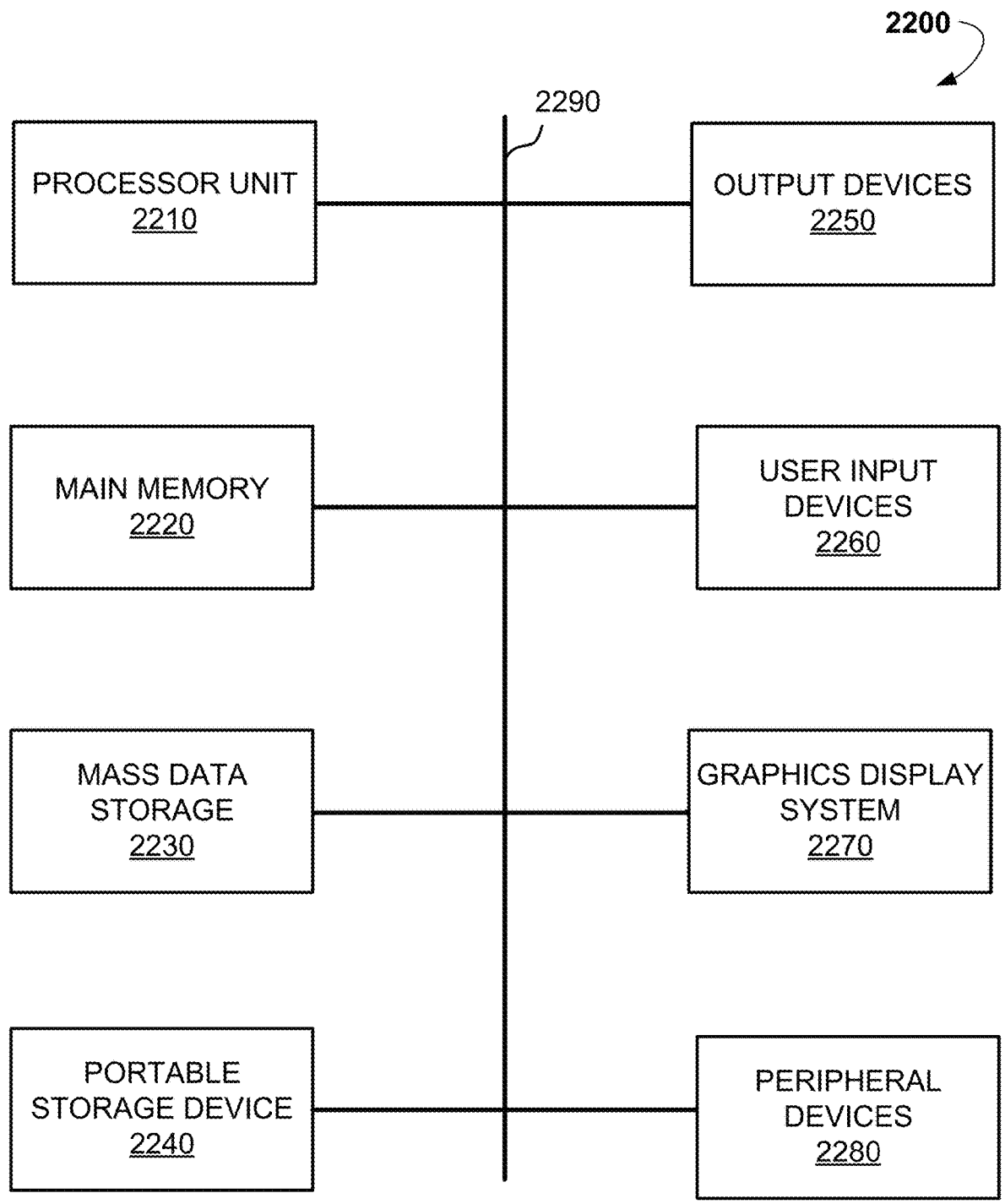
FIG. 22 illustrates an exemplary computing system that may be used to implement embodiments of the present invention.

FIG. 22 illustrates an exemplary computing system 2200 that may be used to implement embodiments of the present invention. The system 2200 of FIG. 22 may be implemented in the contexts of the likes of computing systems, networks, servers, or combinations thereof. The computing system 2200 of FIG. 8 includes one or more processors 2210 and main memory 2220. Main memory 2220 stores, in part, instructions and data for execution by processor 2210. Main memory 2220 may store the executable code when in operation. The system 2200 of FIG. 22 further includes a mass storage device 2230, portable storage medium drive(s) 2240, output devices 2250, user input devices 2260, a graphics display 2270, and peripheral devices 2280.

The components shown in FIG. 22 are depicted as being connected via a single bus 2290. The components may be connected through one or more data transport means. Processor unit 2210 and main memory 2220 may be connected via a local microprocessor bus, and the mass storage device 2230, peripheral device(s) 2280, portable storage device 2240, and display system 2270 may be connected via one or more input/output (I/O) buses.

Mass storage device 2230, which may be implemented with a magnetic disk drive or an optical disk drive, is a non-volatile storage device for storing data and instructions for use by processor unit 2210. Mass storage device 2230 may store the system software for implementing embodiments of the present invention for purposes of loading that software into main memory 2220.

Portable storage device 2240 operates in conjunction with a portable non-volatile storage medium, such as a floppy disk, compact disk, digital video disc, or USB storage device, to input and output data and code to and from the computer system 2200 of FIG. 22. The system software for implementing embodiments of the present invention may be stored on such a portable medium and input to the computer system 2200 via the portable storage device 2240.

Input devices 2260 provide a portion of a user interface. Input devices 2260 may include one or more microphones, an alphanumeric keypad, such as a keyboard, for inputting alpha-numeric and other information, or a pointing device, such as a mouse, a trackball, stylus, or cursor direction keys. Input devices 2260 may also include a touchscreen. Additionally, the system 2200 includes output devices 2250. Suitable output devices include speakers, printers, network interfaces, and monitors.

Display system 2270 may include a liquid crystal display (LCD) or other suitable display device. Display system 2270 receives textual and graphical information, and processes the information for output to the display device.

Peripherals 2280 may include any type of computer support device to add additional functionality to the computer system. Peripheral device(s) 2280 may include a GPS navigation device, telematics device (e.g. OnStar), entertainment device, GSM modem, satellite radio, router, and the like.

The components provided in the computer system 2200 are those typically found in computer systems that may be suitable for use with embodiments of the present invention and are intended to represent a broad category of such computer components that are well known in the art. Thus, the computer system 2200 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, nonvolatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

Thus, methods and systems for filtering unsolicited emails have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for dynamically detecting abnormalities in otherwise legitimate emails containing Uniform Resource Locators (URLs), the method comprising:
   determining, using one or more processors, one or more rules that define normal patterns in a number of sending Top-Level Domains of previously received emails, associated with a user or a group of users, received via a computer network by the user or the group of users;
   generating a trusted trends criteria for a received email, associated with the user or the group of users, by evaluating the received email against the one or more rules;
   determining whether the trusted trends criteria exceeds a predetermined threshold;
   based on the determining that the trusted trends criteria exceeds the predetermined threshold, generating a second URL and applying the second URL to the received email by replacing a first URL of the received email with the second URL; and
   redetermining, using the one or more processors, the one or more rules that define the normal patterns in the number of sending Top-Level Domains based on the previously received emails and the received email.

2. The method of claim 1, wherein the normal patterns further comprise normal patterns in a number of received emails, addressed to the user, by time of day, and a number of received emails, addressed to the group of users, by time of day.

3. The method of claim 1, wherein the normal patterns further comprise normal patterns in a receive to send ratio by address.

4. The method of claim 1, wherein the normal patterns further comprise normal patterns in:
   a number of emails by size,
   a number of emails per mail user agent,
   a number of emails by language,
   a number of emails by character set,
   a number of emails by number of attachments,
   a number of emails by content type,
   a number of emails having a header and a number of emails lacking a header, and
   a percentage of unsolicited emails received.

5. The method of claim 1, wherein the normal patterns further comprise normal patterns in a number of Internet Protocol (IP) addresses in an Autonomous System Number (ASN).

6. The method of claim 1, wherein the normal patterns further comprise normal patterns in:
   email volume per Internet Protocol (IP) address,
   a number of domains per an Autonomous System Number (ASN), and
   a number of emails by size.

7. The method of claim 1, wherein the normal patterns further comprise normal patterns in a number of emails received per domain.

8. The method of claim 1, wherein the normal patterns further comprise normal patterns in a number of headers per email.

9. The method of claim 1, wherein the normal patterns further comprise normal patterns in:
   a number of emails per language,
   a number of emails by character set,
   a number of emails by country,
   a number of emails by number of attachments, or
   a number of emails by content type.

10. The method of claim 1, wherein the normal patterns further comprise normal patterns in a number of emails to a target by an Internet Protocol (IP) address.

11. The method of claim 1, wherein the normal patterns further comprise normal patterns in a number of Uniform Resource Locators (URLs) per email.

12. The method of claim 1, further comprising marking, based on the determining that the trusted trends criteria exceeds the predetermined threshold, the received email as a suspicious email.

13. A system for dynamically detecting abnormalities in otherwise legitimate emails containing Uniform Resource Locators (URLs), the system comprising:
   a processor; and
   a memory for storing logic, the logic being executed by the processor to execute operations comprising:

determining, using one or more processors, one or more rules that define normal patterns in a number of sending Top-Level Domains of previously received emails, associated with a user or a group of users, received via a computer network by the user or the group of users;

generating a trusted trends criteria for a received email, associated with the user or the group of users, by evaluating the received email against the one or more rules;

determining whether the trusted trends criteria exceeds a predetermined threshold;

based on the determining that the trusted trends criteria exceeds the predetermined threshold, generating a second URL and applying the second URL to the received email by replacing a first URL of the received email with the second URL; and redetermining, using the one or more processors, the one or more rules that define the normal patterns in the number of sending Top-Level Domains based on the previously received emails and the received email.

14. The system of claim 13, wherein the normal patterns further comprise normal patterns in a number of received emails, addressed to the user, by time of day, and a number of received emails, addressed to the group of users, by time of day.

15. The system of claim 13, wherein the operations further comprise marking, based on the determining that the trusted trends criteria exceeds the predetermined threshold, the received email as a suspicious email.

16. The system of claim 13, wherein the operations further comprise informing an email service provider that the first URL was replaced with the second URL, the second URL being a predetermined safe URL.

17. A method for dynamically detecting abnormalities in otherwise legitimate emails containing Uniform Resource Locators (URLs), the method comprising:

determining, using one or more processors, one or more rules that define normal patterns in a number of sending Top-Level Domains of previously received emails, associated with a user or a group of users, received via a computer network by the user or the group of users;

generating a trusted trends criteria for a received email, associated with the user or the group of users, by evaluating the received email against the one or more rules;

determining whether the trusted trends criteria exceeds a predetermined threshold;

based on the determining that the trusted trends criteria exceeds the predetermined threshold, sandboxing the received email; and redetermining, using the one or more processors, the one or more rules that define the normal patterns in the number of sending Top-Level Domains based on the previously received emails and the received email.

* * * * *